(12) United States Patent
Ayres et al.

(10) Patent No.: US 11,009,704 B2
(45) Date of Patent: May 18, 2021

(54) PUPIL EXPANSION

(71) Applicant: Akonia Holographies LLC, Longmont, CO (US)

(72) Inventors: Mark Ayres, Longmont, CO (US); Kenneth Anderson, Longmont, CO (US); Adam Urness, Longmont, CO (US); Friso Schlottau, Lyons, CO (US)

(73) Assignee: Akonia Holographies LLC, Longmont, CO (US)

( * ) Notice: Subject to any disclaimer, the term of this patent is extended or adjusted under 35 U.S.C. 154(b) by 143 days.

(21) Appl. No.: 16/090,057

(22) PCT Filed: Jun. 20, 2017

(86) PCT No.: PCT/US2017/038399
§ 371 (c)(1),
(2) Date: Sep. 28, 2018

(87) PCT Pub. No.: WO2017/223121
PCT Pub. Date: Dec. 28, 2017

(65) Prior Publication Data
US 2019/0391393 A1    Dec. 26, 2019

Related U.S. Application Data

(60) Provisional application No. 62/504,890, filed on May 11, 2017, provisional application No. 62/479,985, (Continued)

(51) Int. Cl.
*G02B 27/01* (2006.01)
*F21V 8/00* (2006.01)

(52) U.S. Cl.
CPC .......... *G02B 27/0172* (2013.01); *G02B 6/005* (2013.01); *G02B 2027/0123* (2013.01); *G02B 2027/0174* (2013.01)

(58) Field of Classification Search
CPC ............ G02B 27/0101; G02B 27/0103; G02B 27/0105; G02B 27/0172; G02B 27/0123;
(Continued)

(56) References Cited

U.S. PATENT DOCUMENTS 7,418,170 B2    8/2008    Mukawa et al.
7,502,168 B2    3/2009    Akutsu et al.
(Continued)

FOREIGN PATENT DOCUMENTS

CN    103823267 A    5/2014
EP    2065751 A2    6/2009
(Continued)

OTHER PUBLICATIONS

Saleh et al. "Fundamentals of Photonics" Wiley Interscience Publications, p. 149-151 (Year: 1991).*

*Primary Examiner* — Kristina M Deherrera
(74) *Attorney, Agent, or Firm* — Michael H. Lyons

(57) ABSTRACT

A device including a waveguide having a first waveguide surface and a second waveguide surface parallel to the first waveguide surface is disclosed. The device may include a first volume holographic light coupling element disposed between the first waveguide surface and the second waveguide surface. The first volume holographic light coupling element may be structured to reflect at least a portion of incident light as reflected light. Incident light for which the first volume holographic light coupling element is structured to reflect may have a first angle of incidence within a total internal reflection (TIR) range with respect a first axis corresponding to a surface normal of the waveguide. Incident light for which the first volume holographic light coupling element is structured to reflect may have a second angle of incidence with respect to a second axis different from the first axis.

35 Claims, 14 Drawing Sheets

Related U.S. Application Data filed on Mar. 31, 2017, provisional application No. 62/465,619, filed on Mar. 1, 2017, provisional application No. 62/385,686, filed on Sep. 9, 2016, provisional application No. 62/352,534, filed on Jun. 20, 2016.

(58) Field of Classification Search
CPC .......... G02B 27/017; G02B 2027/0125; G02B 2027/0174; G02B 6/34; G02B 6/005; G02B 2027/0123; G02B 6/12006; G02B 2027/0132; G02B 2027/0178
USPC .................................................... 359/13, 630
See application file for complete search history.

(56) References Cited

U.S. PATENT DOCUMENTS

| | | | |
|---|---|---|---|
| 7,764,413 | B2 | 7/2010 | Levola |
| 8,160,411 | B2 | 4/2012 | Levola et al. |
| 8,233,204 | B1 | 7/2012 | Robbins et al. |
| 8,446,675 | B1 | 5/2013 | Wang et al. |
| 8,665,178 | B1 | 3/2014 | Wang |
| 8,736,963 | B2 | 5/2014 | Robbins et al. |
| 8,820,996 | B2 | 9/2014 | Aiki et al. |
| 8,903,207 | B1 | 12/2014 | Brown et al. |
| 9,075,184 | B2 | 7/2015 | Popovich et al. |
| 9,341,846 | B2 | 5/2016 | Popovich et al. |
| 9,456,744 | B2 | 10/2016 | Popovich et al. |
| 9,651,368 | B2 | 5/2017 | Abovitz et al. |
| 9,709,809 | B2 | 7/2017 | Miyawaki et al. |
| 9,791,696 | B2 | 10/2017 | Woltman et al. |
| 10,048,647 | B2 * | 8/2018 | Large ................. G01J 1/4204 |
| 10,088,675 | B1 | 10/2018 | Brown et al. |
| 10,175,478 | B2 | 1/2019 | Tekolste et al. |
| 10,203,762 | B2 * | 2/2019 | Bradski ............... G02B 30/52 |
| 10,359,627 | B2 | 7/2019 | Wall et al. |
| 2005/0099930 | A1 * | 5/2005 | Volodin ............... G03H 1/0248 369/109.01 |
| 2006/0228073 | A1 | 10/2006 | Mukawa et al. |
| 2007/0188837 | A1 | 8/2007 | Shimizu et al. |
| 2009/0141324 | A1 * | 6/2009 | Mukawa ............... G02B 27/0081 359/13 |
| 2011/0019258 | A1 | 1/2011 | Levola |
| 2013/0250430 | A1 | 9/2013 | Robbins et al. |
| 2014/0140654 | A1 | 5/2014 | Brown et al. |
| 2015/0160529 | A1 | 6/2015 | Popovich et al. |
| 2015/0268467 | A1 | 9/2015 | Cakmakci et al. |
| 2015/0277116 | A1 * | 10/2015 | Richards ............. G02B 27/0172 359/13 |
| 2016/0154150 | A1 | 6/2016 | Simmonds et al. |
| 2017/0031160 | A1 | 2/2017 | Popovich et al. |
| 2017/0131551 | A1 | 5/2017 | Robbins et al. |
| 2017/0235144 | A1 * | 8/2017 | Piskunov ................ G02B 6/34 359/13 |
| 2017/0276940 | A1 | 9/2017 | Popovich et al. |
| 2018/0052277 | A1 | 2/2018 | Schowengerdt et al. |
| 2018/0101011 | A1 | 4/2018 | Shih et al. |
| 2018/0149791 | A1 | 5/2018 | Urness et al. |
| 2018/0172995 | A1 | 6/2018 | Lee et al. |
| 2019/0094981 | A1 | 3/2019 | Bradski et al. |
| 2020/0201051 | A1 | 6/2020 | Popovich et al. |

FOREIGN PATENT DOCUMENTS

| | | |
|---|---|---|
| JP | 2007-219106 A | 8/2007 |
| JP | 2009516862 A | 4/2009 |
| JP | 2014-132328 A | 7/2014 |
| KR | 10-2015-0023712 | 3/2015 |
| WO | 2009083977 A2 | 7/2009 |
| WO | 2016042283 A1 | 3/2016 |
| WO | 2016054092 A1 | 4/2016 |
| WO | 2017044873 A1 | 3/2017 |
| WO | 2017222808 A1 | 12/2017 |

* cited by examiner

600

PUPIL EXPANSION

CROSS-REFERENCE TO RELATED PATENT APPLICATIONS

This application claims priority from U.S. Application Nos. 62/352,534, filed 20 Jun. 2016, and titled "SKEW MIRROR PUPIL EXPANSION," 62/385,686, filed 9 Sep. 2016, and titled "PUPIL EXPANDER," 62/465,619, filed 1 Mar. 2016, and titled "PUPIL EXPANDER," 62/479,985, filed 31 Mar. 2017, and titled "PUPIL EXPANDER," and 62/504,890, filed 11 May 2017, titled "PUPIL EXPANDER." The above applications are incorporated herein by reference for all purposes, in their entireties.

FIELD OF TECHNOLOGY

The present disclosure relates generally to optical reflective devices, and more specifically to expanding light beams within optical reflective devices.

BACKGROUND

Conventional dielectric mirrors are produced by coating a surface (typically glass) with layers of materials that differ from each other in their electric permittivity. The layers of materials are typically arranged so that Fresnel reflections from layer boundaries reinforce constructively, producing large net reflectivity. Broadband dielectric mirrors can be designed by ensuring that this condition obtains over a relatively broad specified range of wavelengths and incidence angles. However, because the layers are deposited on a surface, the reflective axis of a dielectric mirror is necessarily coincident with surface normal (i.e., the reflective axis is perpendicular to the mirror surface). Because of this constraint on the reflective axis, a dielectric mirror is disposed in some devices in a configuration that is suboptimal. Similarly, the reflective axis being constrained to surface normal makes a dielectric mirror inadequate for some purposes. Moreover, glass dielectric mirrors tend to be relatively heavy, making them suboptimal or inappropriate for applications requiring a relatively lightweight reflective component.

Conversely, conventional grating structures can reflect light about a reflective axis that differs from surface normal of the medium in which the grating structure resides. However, for a given angle of incidence, angles of reflection for conventional grating structures typically co-vary with wavelength of incident light. Thus, using a conventional grating structure to reflect light may avoid the constraint inherent in conventional mirrors that the reflective axis coincide with surface normal. However, where a substantially constant reflective axis is required, a conventional grating structure is substantially limited to a single wavelength (or very narrow range of wavelengths) for a given angle of incidence. Similarly, in order to reflect light of a specified wavelength about a constant reflective axis, a conventional grating structure is limited to a single angle of incidence (or very narrow range of incidence angles).

Accordingly, conventional reflective devices, comprising reflective grating structures or conventional mirrors may not satisfy properties necessary of the device, including light reflectivity about a reflective axis not constrained to surface normal, and an angle of reflection that is constant across a range of incidence angles. Furthermore, conventional structures and coupling components of a conventional reflective device may interact with light of the device (e.g., with total internal reflection (TIR) mode reflected light and non-TIR straight through external light) and impede optical clarity of the projection. As a result, conventional reflective devices may provide suboptimal image projection and retard optical clarity at the yielded FOV of these devices. Such results may be particularly acute in head mounted display (HMD) devices.

SUMMARY

The described features generally relate to one or more improved methods, systems, or devices for expanding light beams from an entrance pupil to an exit pupil (i.e., pupil expansion). The methods, systems, or devices may employ one or more pupil expanders or pupil expansion techniques in an optical device or system to enable an increased field of view (FOV) of a projected image.

In one embodiment, a device or system may include a waveguide having a first waveguide surface and a second waveguide surface parallel to the first waveguide surface and a first volume holographic light coupling element disposed between the first waveguide surface and the second waveguide surface. The first volume holographic light coupling element may be structured to reflect at least a portion of incident light as reflected light. The incident light may have a first angle of incidence within a TIR range with respect a first axis corresponding to a surface normal of the waveguide and a second angle of incidence with respect to a second axis. The reflected light may have a first angle of reflection within the TIR range and a second angle of reflection with respect to the second axis. In some cases, the second angle of reflection may be different from the second angle of incidence.

Some examples of the device or system described above may also include a second volume holographic light coupling element disposed between the first waveguide surface and the second waveguide surface. The second volume holographic light coupling element may have a second reflective axis oriented different from the first reflective axis. In some examples of the device or system described above, the first volume holographic light coupling element may have a first reflective axis that may be oriented on a plane parallel to the first waveguide surface.

In some examples of the device or system described above, the first volume holographic light coupling element may comprise a grating medium. Some examples of the device or system described above may also include a first grating structure within the grating medium, the first grating structure being structured to reflect at least a portion of incident light of a first wavelength about a first reflective axis at the first angle of incidence within the TIR range with respect the first axis.

In some examples described above, the first volume holographic light coupling element further comprises a second grating structure within the grating medium, the second grating structure being structured to reflect at least a portion of incident light of the first wavelength about another reflective axis at another angle of incidence different from the first incidence angle. In some examples described above, the other angle of incidence associated with the second grating structure may be within the TIR range with respect the first axis. In some examples described above, the other reflective axis of the second grating may have a reflective axis angle that differs from a reflective axis angle of the first reflective axis by 0.25 degrees or less.

In some examples described above, the first grating structure and the second grating structure correspond a same locus associated with an internal field of view angle of image light. In some examples described above, the first grating structure corresponds to a first locus of one or more volume holograms associated with a first internal field of view (FOV) angle of image light and the second grating structure corresponds to a second locus of one or more volume holograms associated with a second internal FOV angle of the image light different from the first internal FOV angle. In some examples described above, the first locus and the second locus at least partially overlap.

In some examples of the undefined described above, the first grating structure may be further configured to reflect at least a portion of incident light of the wavelength about the first reflective axis at a first range of incidence angles including the first incidence angle, each incidence angle of the first range of incidence angles being within the TIR range with respect the first axis.

In some examples described above, the first grating structure comprises at least three volume holograms, each volume hologram of the at least three volume holograms corresponding to a unique incidence angle within the first range of incidence angles, and wherein an adjacent $|\Delta K_G|$ for the at least three holograms may have a mean value that resides between $1.0 \times 10^4$ and $1.0 \times 10^6$ radians per meter (rad/m).

In some examples of the device or system described above, the first volume holographic light coupling element comprises a grating medium that may be at least 70 μm thick and the grating medium comprises a plurality of volume holograms structured to Bragg-match incident light for at least some angles of incidence within the TIR range.

In some examples of the device or system described above, the first volume holographic light coupling element comprises a first coupling portion that may be configured to reflect at least a portion of incident light as reflected light about a first reflective axis and a second coupling portion that may be configured to reflect at least a portion of incident light as reflected light about a second reflective axis oriented on a plane parallel to the first waveguide surface, the second reflective axis being non-parallel to the first reflective axis.

In some examples described above, the first reflective axis may be configured to reflect at least a portion of incident light as reflected light within a first location of the waveguide and the second reflective axis may be configured to reflect at least a portion of incident light as reflected light within a second location of the waveguide.

In some examples described above, the first coupling portion at least partially overlaps the second coupling portion such that the first reflective axis may be configured to reflect at least a portion of incident light at an overlapping location and the second reflective axis may be configured to reflect at least a portion of incident light at the overlapping location. Some examples of the system described above may also include an entrance pupil element aligned with the joint associated with the first coupling portion and the second coupling portion such that the entrance pupil element may be structured to allow input light into the first coupling portion and the second coupling portion.

In some examples of the described above, the first coupling portion of the first volume holographic light coupling element and the second coupling portion of the first volume holographic light coupling element may be aligned at a joint.

In some examples described above, the intercoupled waveguide may be coupled to the waveguide by an overlapping joint. In some examples described above, the intercoupled waveguide may be coupled to the waveguide with an optical adhesive element. In some examples described above, the intercoupled waveguide operatively may be coupled to the waveguide by an end to end joint.

Some examples of the device or system described above may also include an intercoupled waveguide coupled to the waveguide. Some examples of the device or system described above may also include a first waveguide section located within the waveguide, wherein the first volume holographic light coupling element may be at least partially disposed within the first waveguide section. Some examples of the device or system described above may also include a first entrance pupil located at a first edge of the first waveguide section. In some examples described above, the first waveguide section and the second waveguide section at least partially overlap.

Some examples of the system described above may also include a second waveguide section located within the waveguide, wherein the first volume holographic light coupling element may be at least partially disposed within the first waveguide section. Some examples of the system described above may also include a second entrance pupil located at a second edge of the second waveguide section.

Some examples of the device or system descried above may also include a waveguide having a first waveguide surface and a second waveguide surface parallel to the first waveguide surface. Some examples of the device or system descried above may also include a cross-coupling element disposed between the first waveguide surface and the second waveguide surface, the cross-coupling element having a first reflective axis that is oriented on a plane parallel to the first waveguide surface. Some examples of the device or system descried above may also include a volume holographic light coupling element disposed between the first waveguide surface and the second waveguide surface, the volume holographic light coupling element having a second reflective axis that is oriented on a plane different from a plane on which the first reflective axis is oriented.

In some examples described above, the cross-coupling element may be structured to reflect at least a portion of incident light as reflected light, the incident light having a first angle of incidence within a total internal reflection (TIR) range with respect a first axis corresponding to a surface normal of the waveguide and a second angle of incidence with respect to a second axis different from the first axis, and the reflected light having a first angle of reflection within the TIR range and a second angle of reflection with respect to the second axis, the second angle of reflection being different from the second angle of incidence.

In one embodiment, a device or system may include the cross-coupling element having a first reflective axis that is oriented on a plane parallel to the first waveguide surface and a volume holographic light coupling element disposed between the first waveguide surface and the second waveguide surface, the volume holographic light coupling element having a second reflective axis that is oriented on a plane different from a plane on which the first reflective axis is oriented. In some examples of the device or system described above, the cross-coupling element comprises a partially reflective louver, the partially reflective louver being structured to reflect at least a portion of incident light as reflected light.

In some examples described above, the first reflective axis may be offset from a surface normal of the first waveguide surface. In some examples described above, the second reflective axis of the volume holographic light coupling element may be oriented different from the first reflective axis. For example, the second reflective axis may be oriented orthogonal to the first reflective axis. In some examples of the undefined described above, the cross-coupling element may be coupled to the volume holographic light coupling element by an end to end joint.

In some examples described above, the volume holographic light coupling element comprises a grating medium. Some examples of the system described above may also include a first grating structure within the grating medium of the volume holographic light coupling element, the first grating structure being configured to reflect total internal reflection (TIR) light of a wavelength at a first TIR incidence angle about the second reflective axis.

In some examples described above, the volume holographic light coupling element further comprises a second grating structure within the grating medium of the volume holographic light coupling element at least partially non-overlapping with the first grating structure, the second grating structure being configured to reflect TIR light of the wavelength a second TIR incidence angle about the second reflective axis. In some examples described above, the second TIR incidence angle being different from the first TIR incidence angle by at least 5°. In some examples of the undefined described above, the wavelength comprises one of a visible red light wavelength, a visible blue light wavelength, or a visible green light wavelength.

In some examples described above, the first grating structure comprises at least three volume holograms, each of the at least three volume holograms corresponding to a unique incidence angle within a range of TIR incidence angles, and wherein an adjacent $|\Delta K_G|$ for the at least three holograms may have a mean value that resides between $1.0 \times 10^4$ and $1.0 \times 10^6$ radians per meter (rad/m).

In one embodiment, a device or system may include a light source for providing image-bearing light, an optical lens comprising a light input section of the optical lens for receiving the image-bearing light, a waveguide having a first waveguide surface and a second waveguide surface parallel to the first waveguide surface, and a first volume holographic light coupling element disposed between the first waveguide surface and the second waveguide surface, the first volume holographic light being structured to reflect at least a portion of incident light as reflected light, the incident light having a first angle of incidence within a total internal reflection (TIR) range with respect a first axis corresponding to a surface normal of the waveguide and a second angle of incidence with respect to a second axis different from the first axis, and the reflected light having a first angle of reflection within the TIR range and a second angle of reflection with respect to the second axis, the second angle of reflection being different from the second angle of incidence.

In some examples described above, the optical lens further comprises a second volume holographic light coupling element disposed between the first waveguide surface and the second waveguide surface, the second volume holographic light coupling element may have a second reflective axis oriented different from the first reflective axis.

In one embodiment, a device or system may include a light source for providing image-bearing light, an optical lens comprising a light input section of the optical lens for receiving the image-bearing light, a waveguide having a first waveguide surface and a second waveguide surface parallel to the first waveguide surface, a cross-coupling element disposed between the first waveguide surface and the second waveguide surface, the cross-coupling element having a first reflective axis that is oriented on a plane parallel to the first waveguide surface, and a volume holographic light coupling element disposed between the first waveguide surface and the second waveguide surface, the volume holographic light coupling element having a second reflective axis that is oriented on a plane different from a plane on which the first reflective axis is oriented.

In one embodiment, the cross-coupling element is structured to reflect at least a portion of incident light as reflected light, the incident light having a first angle of incidence within a total internal reflection (TIR) range with respect a first axis corresponding to a surface normal of the waveguide and a second angle of incidence with respect to a second axis different from the first axis, and the reflected light having a first angle of reflection within the TIR range and a second angle of reflection with respect to the second axis, the second angle of reflection being different from the second angle of incidence.

In some examples described above, the method may include making a device including one or more volume holographic light coupling elements, comprising positioning a recording medium with respect to a first prism such that a first recording beam and a second recording beam pass through the first prism to record an interference pattern on the recording medium and recording a first reflective axis in the recording medium such that a first reflective axis is oriented parallel to a thickness dimension of the recording medium

BRIEF DESCRIPTION OF THE DRAWINGS

A further understanding of the nature and advantages of implementations of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
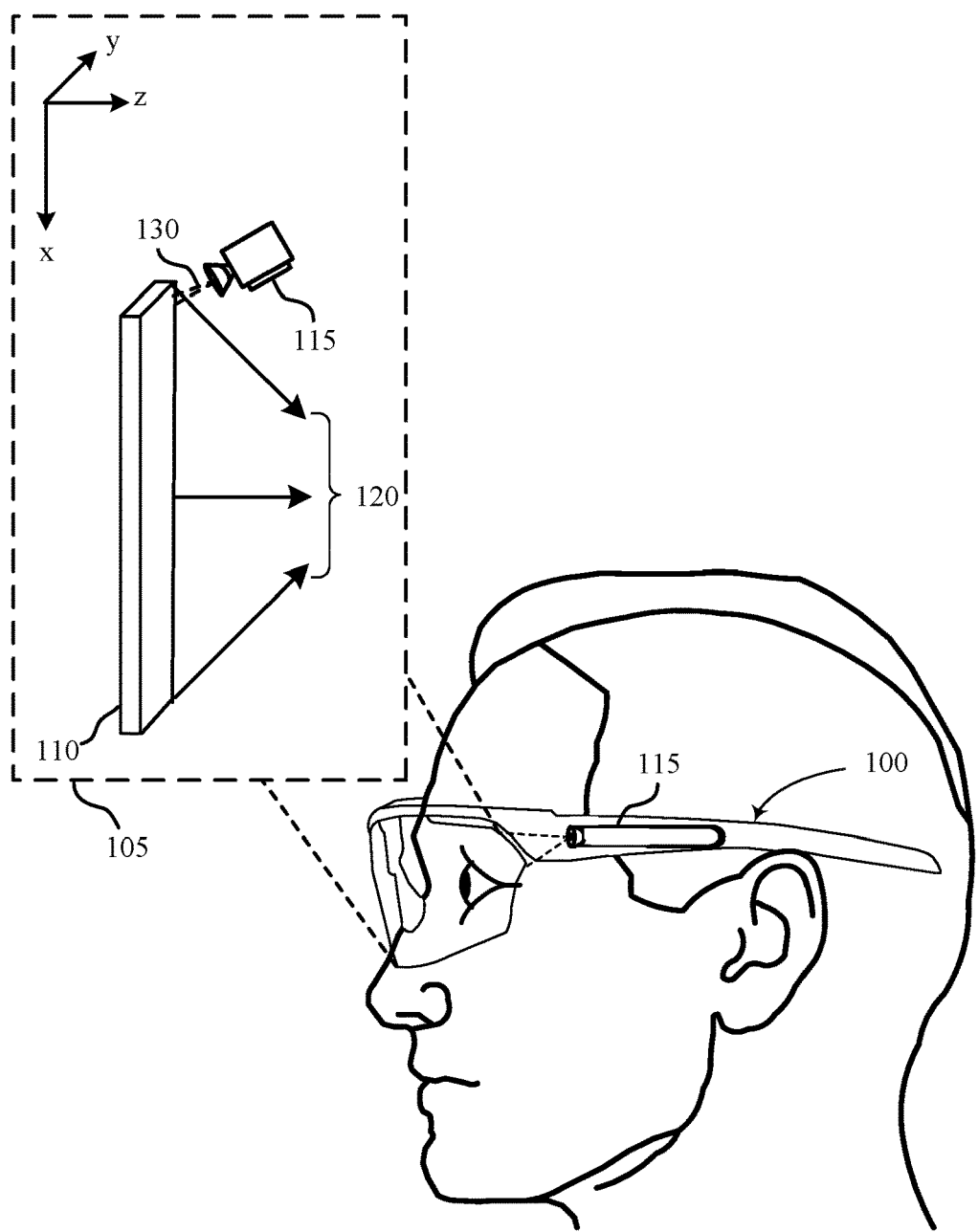
FIG. 1 is an illustration of an HMD device in which the principles included herein may be implemented.

Volumetric holographic gratings (VHGs) may be used as a light coupling device (e.g., an input coupler, an output coupler, and/or a cross coupler) within an image projection system. Each conventional coupling device may transmit light through a waveguide, employ pupil expansion, and provide an image projection, in accordance with additional features of the coupling device. A conventional coupling device may include embossed diffractive gratings, diffractive optical elements (DOEs), holographic optical elements (HOEs), and angled partially reflective surfaces to support at least the aforementioned features. The one or more properties of the conventional coupling device, including the thickness and bulk index of refraction, may determine an accessible total internal reflection (TIR) input angle range, as well as a yielded field of view (FOV) capability. In some cases, a conventional coupling device, either alone or in combination with additional coupling devices, may incur limitations or impedances to optical clarity and the FOV. For example, the conventional coupling device may interact with each of the bidirectional reflections of light operating in a TIR mode, thereby impeding the yielded FOV. In other examples, the conventional coupling device may interact with light straight through the device (e.g., non-TIR modes) or experience chromatic dispersion, impeding the optical clarity of an image projection system.

One or more skew mirror type components or devices may be employed in a light coupling device (e.g., an input coupler, an output coupler, and/or a cross coupler) for pupil expansion. Utilizing skew mirror technology in the one or more light coupling devices may improve viewing capability and optical clarity of an associated image projection device, such as a head-mounted display unit. A skew mirror type device may exhibit achromatic characteristics. A skew mirror type device (e.g., an output coupler embodiment) may be Bragg-mismatched to one reflection of TIR mode input light that is reflected between substrates and to input light passing straight through the skew mirror type device (e.g., external light incident on a substrate surface). An image projection device utilizing skew mirror technology may provide a more expansive FOV and avoid impedances to optical clarity when compared to an image projection device using conventional coupling devices.

One or more skew mirror type components or devices (e.g., an input coupler embodiment) may guide input light from a light source to an entrance pupil. One or more skew mirror type components or devices (e.g., a cross coupler embodiment) may guide input light from an entrance pupil propagating in one direction and reflect the input light for propagation through a waveguide in a different direction. A cross coupler embodiment may advantageously allow a dimension (e.g., a vertical or a horizontal dimension) of the projected image to remain unguided throughout the entrance-to-exit pupil optical path (i.e., a projected dimension may correspond to angles transverse to the TIR dimension). One or more skew mirror type components or devices (e.g., an output coupler embodiment) may allow for image projection with reduced divergent light loss. Light coupling device embodiments utilizing skew mirror technology of an image projection system may be contained within one or more intercoupled waveguides, further improving image projection efficiency and increasing device compactness. Light coupling device embodiments utilizing skew mirror technology may be incorporated into an image projection system that also utilizes other, non-skew mirror light coupling device embodiments.

One or more holographic optical elements may be used in a waveguide of optical head-mounted display (HMD) device. An HMD device is a wearable device that has the capability of reflecting projected images and may facilitate a user to experience augmented reality. Head-mounted displays typically involve near-eye optics that project virtual images. In the past, technical limitations of HMDs have resulted in experience impediments including reduced image quality and increased weight and size. Past implementations have included conventional optics to reflect, refract or diffract light, however, the designs tend to be bulky. Additionally, conventional mirrors and grating structures have inherent limitations. For example, a conventional mirror may have a reflective axis that is necessarily coincident with surface normal, imposing a suboptimal mirror orientation, or hindered reflective output at the mirror. Also, conventional grating structures may include multiple reflective axes that co-vary unacceptably with the incidence angle and/or wavelength of light incident on the structure.

Accordingly, a device for reflecting light may include features that reflect light about a reflective axis not constrained to surface normal, with an angle of reflection, for a given angle of incidence, that is constant at multiple wavelengths. Embodiments of the device may have substantially constant reflective axes (i.e., reflective axes that have reflective axis angles that vary by less than 1.0 degree) across a range of incidence angles for incident light of a given wavelength, and this phenomenon may be observed with incident light at various wavelengths.

Aspects of the disclosure are initially described in the context of an apparatus for reflecting light towards an eye box situated at a fixed distance away from a skew mirror. Specific examples are described for an apparatus including a grating medium. In some cases the grating medium may include one or more grating structures. A grating structure may be configured to reflect light, of a particular wavelength, about a reflective axis offset from a surface normal of the grating structure at a particular plurality of incident angles. Aspects of the disclosure are further illustrated by and described with reference to apparatus diagrams, system diagrams, and flowcharts that relate to pupil expansion.

This description provides examples, and is not intended to limit the scope, applicability or configuration of implementations of the principles described herein. Rather, the ensuing description will provide those skilled in the art with an enabling description for implementing implementations of the principles described herein. Various changes may be made in the function and arrangement of elements.

Thus, various implementations may omit, substitute, or add various procedures or components as appropriate. For instance, it should be appreciated that the methods may be performed in an order different than that described, and that various steps may be added, omitted or combined. Also, aspects and elements described with respect to certain implementations may be combined in various other implementations. It should also be appreciated that the following systems, methods, devices, and software may individually or collectively be components of a larger system, wherein other procedures may take precedence over or otherwise modify their application.

FIG. 1 is an illustration of an HMD device 100 in which the principles included herein may be implemented. The HMD device 100 may include eyewear or headwear in which a near-eye display (NED) 105 may be affixed in front of a user's eyes. The NED 105 may include a diffractive element portion disposed within or incorporated with a lens assembly of the HMD device 100. In some examples, the diffractive element portion may be a holographic optical element (HOE), which may be comprised of a skew mirror 110. Coordinates (x, y, and z-axis) are provided with reference to the skew mirror 110. The HMD device 100 may include multiple light coupling elements including additional skew mirrors (not shown), HOEs not structured using skew mirror technology and principles (not shown), DOEs (not shown), and/or louvered mirrors (not shown) assembled with the skew mirror 110. The HMD 100 may also include a light source or light projector 115 operatively coupled to the lens assembly. In some examples light source or light projector 115 may be operatively coupled to the lens assembly in a waveguide configuration. In some examples light source or light projector 115 may be operatively coupled to the lens assembly in a free space configuration.

The skew mirror 110 may be a reflective device and may include a grating medium within which resides one or more volume holograms or other grating structures. The skew mirror 110 may include an additional layer such as a glass cover or glass substrate. The additional layer may serve to protect the grating medium from contamination, moisture, oxygen, reactive chemical species, damage, and the like. The additional layer may also be refractive index matched with the grating medium. The grating medium, by virtue of the grating structure residing therein, may have physical properties that allow the medium to diffract light about an axis, referred to as a reflective axis, where the angle of diffraction (henceforth referred to as angle of reflection) varies by less than 1° for multiple wavelengths of light incident upon the grating medium at a given angle of incidence. In some cases, the reflective axis is also constant for multiple wavelengths and/or angles of incidence. In some cases, the grating structure is formed by one or more holograms. The one or more holograms can be volume-phase holograms in some implementations. Other types of holograms may also be used in various implementations of the grating structure.

Similarly, implementations may have substantially constant reflective axes (i.e., reflective axes have reflective axis angles that vary by less than 1°) across a range of incidence angles for incident light of a given wavelength, and this phenomenon may be observed with incident light at various wavelengths. In some implementations, the reflective axes remain substantially constant for every combination of a set of multiple incidence angles and a set of multiple wavelengths.

A hologram may be a recording of an interference pattern, and may include both intensity and phase information from the light used for the recording. This information may be recorded in a photosensitive medium that converts the interference pattern into an optical element that modifies the amplitude or the phase of subsequent incident light beams, according to the intensity of the initial interference pattern. The grating medium may include a photopolymer, photorefractive crystals, dichromatic gelatin, photo-thermo-refractive glass, film containing dispersed silver halide particles, or other material with the ability to react to and record an incident interference pattern. In some cases, coherent laser light may be used for recording and/or reading the recorded hologram.

In some cases, a hologram may be recorded using two laser beams known as recording beams. In some cases, the recording beams may be monochromatic collimated plane wave beams that are similar to each other except for angles at which they are incident upon the grating medium. In some implementations, the recording beams may have amplitude or phase distributions that differ from each other. The recording beams may be directed so that they intersect within the recording medium. At the intersection of the recording beams, the recording beams may interact with the recording medium in a way that varies according to the intensity of each point of the interference pattern, and creates a pattern of varying optical properties within the recording medium. For example, in some embodiments, a refractive index may vary within the recording medium. In some cases, the resulting interference pattern may be spatially distributed (e.g., with a mask or the like) in a manner that is uniform for all such grating structures recorded on the grating medium. In some cases, multiple grating structures may be superimposed within a single recording medium by varying the wavelength or the angle of incidence to create different interference patterns within the recording medium. In some cases, after one or more holograms are recorded in the medium, the medium may be treated with light in a post-recording light treatment. The post recording light treatment may be performed with highly incoherent light to substantially consume remaining reactive medium components such as photoinitiator or photoactive monomer, such that photosensitivity of the recording medium is greatly reduced or eliminated. After recording of holograms or other grating structures in a recording medium has been completed, the medium is typically referred to as a grating medium. In some instances, grating mediums have been rendered non-photosensitive.

In some implementations, the grating structure may include a hologram generated via interference between multiple light beams referred to as recording beams. The grating structure may include multiple holograms. The multiple holograms may be recorded using recording beams incident upon the grating medium at angles that vary among the multiple holograms (i.e., angle multiplexed), and/or using recording beams whose wavelengths vary among the multiple holograms (i.e., wavelength multiplexed)), and/or using recording beams whose positions vary among the multiple holograms (i.e., spatially multiplexed). In some implementations, the grating structure may include a hologram recorded using two recording beams whose angles of incidence upon the grating medium vary while the hologram is being recorded, and/or whose wavelengths vary while the hologram is being recorded. Implementations further include a device wherein the reflective axis differs from surface normal of the grating medium by at least 1.0 degree; or at least by 2.0 degrees; or at least by 4.0 degrees; or at least by 9.0 degrees.

Light projector 115 may provide image-bearing light to the lens assembly. In some instances, the lens assembly and skew mirror may be substantially flat with respect to an orientation plane of the system. In other instances, the lens assembly may exhibit curvature with respect to an orientation plane. For example, in some cases, lens assembly and skew mirror 110 may be substantially flat with respect to the x-y plane. In other cases, the lens assembly may include some curvature with respect to the x-y plane in certain implementations. Reflected light 120 from skew mirror 110 may be reflected towards an eye box situated at a fixed distance along the z-axis away from skew mirror 110. In some examples, skew mirror 110 may be contained at least partially within a waveguide. The waveguide may propagate incident light 130 by total internal reflection towards the skew mirror 110. In some examples, incident light 130 may propagate by free space towards skew mirror 110. The skew mirror 110 may include a grating medium made of a photopolymer. The skew mirror 110 may also include one or more grating structures within the grating medium. Each grating structure may include one or more sinusoidal volume gratings which may overlap with each other. A grating structure may be configured to reflect light of a particular wavelength about a reflective axis offset from a surface normal of the grating medium at a particular plurality of incidence angles. Each grating structure within the grating medium may be configured to reflect a portion of light toward an exit pupil in the eye box at a fixed distance from the waveguide.

Each grating structure may reflect light in a manner different from another grating structure. For example, a first grating structure may reflect incident light of a first wavelength at a first incidence angle, whereas a second grating structure may reflect incident light of a second wavelength at the first incidence angle (e.g., different grating structures may be configured to reflect different wavelengths of light for incident light of the same incidence angle). Also, a first grating structure may reflect incident light of a first wavelength at a first incidence angle, whereas a second grating structure may reflect incident light of the first wavelength at a second incidence angle (e.g., different grating structures may be configured to reflect the same wavelength of light for incident light of different incidence angles). Furthermore, a grating structure may reflect first incident light of a first wavelength and first incidence angle, and the grating structure may reflect second incident light at a second wavelength and second incidence angle about the same reflective axis. In this manner, different grating structures can be used to selectively reflect a particular wavelength of light for incident light at a range of incidence angles. The different grating structures may be super-imposed within the grating medium of the skew mirror 110. The skew mirror 110 may have a substantially constant reflective axis (i.e., each grating structure of the skew mirror 110 has a same substantially constant reflective axis).

In some examples, an HMD device may comprise a light source or light projector 115 for providing image-bearing light and a lens assembly. The lens assembly may include at least one skew mirror 110. The lens assembly may comprise a light input section for receiving the image-bearing light from the light source or light projector 115. A waveguide may be disposed within the lens assembly and operatively coupled to the light input section. In some examples, the waveguide may be omitted and the light source or light projector 115 may be operatively coupled to the lens assembly in a free space configuration. The waveguide may have a first waveguide surface and a second waveguide surface parallel to the first waveguide surface. A first volume holographic light coupling element may be disposed between the first waveguide surface and the second waveguide surface. The first volume holographic light coupling element may be configured or structured to reflect at least a portion of incident light as reflected light. The incident light in the waveguide may have a first angle of incidence within a TIR range with respect a first axis (e.g., z-axis) corresponding to a surface normal of the waveguide and a second angle of incidence with respect to a second axis (e.g., x-axis or y-axis). The reflected light may have a first angle of reflection within the TIR range and a second angle of reflection with respect to the second axis. In some cases, the second angle of reflection may be different from the second angle of incidence.

Some examples of the HMD device or system described above may also include a second volume holographic light coupling element (e.g., skew mirror 110) disposed between the first waveguide surface and the second waveguide surface. The second volume holographic light coupling element may have a second reflective axis oriented different from the first reflective axis.

Figure 2A:
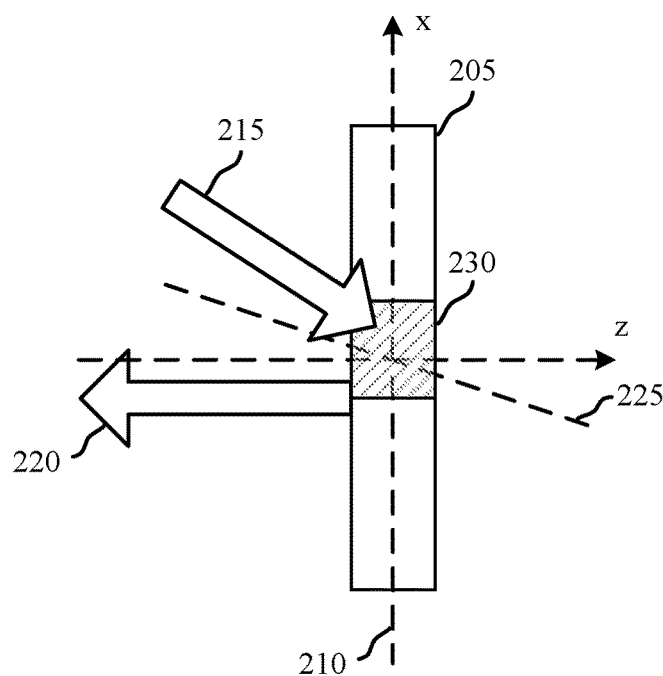
FIG. 2A is a diagram illustrating reflective properties of a skew mirror in real space in accordance with various aspects of the present disclosure.

FIG. 2A is a cross-section view 200 illustrating reflective properties of a skew mirror 205 in real space according to one example. The cross-section view 200 may include a grating structure such as hologram 230 in a grating medium. FIG. 2A omits skew mirror components other than the grating medium, such as an additional layer that might serve as a substrate or protective layer for the grating medium. The substrate or protective layer may serve to protect the grating medium from contamination, moisture, oxygen, reactive chemical species, damage, and the like. Implementations of a skew mirror for pupil equalization may be partially reflective. In this manner, one or more skew mirrors for pupil equalization may be configured or structured to selectively reflect the rays of light to various portions of an optical device (e.g., redirecting light toward a waveguide in an input coupler configuration, redirecting light propagating in a TIR mode within an waveguide in a cross coupler configuration, and/or forming an exit pupil towards an eye box of the optical device). The skew mirror for pupil equalization may be configured to avoid reflecting the rays of light for certain incidence angles, where such a reflection would reflect the rays of light to an area that is not toward the desired exit pupil. Implementations of some skew mirror embodiments may require a relatively high dynamic range recording medium to achieve high reflectivity over a relatively wide wavelength bandwidth and angle range for the resulting grating medium. By contrast, a skew mirror for pupil equalization may require less dynamic range thereby allowing each hologram to be stronger (e.g., recorded with a greater intensity and/or longer exposure time). A skew mirror composed of stronger holograms may provide a brighter image, or allow a dimmer light projector to provide an image of similar brightness. The skew mirror 205 may be characterized by reflective axis 225, at an angle measured with respect to the z-axis. The z-axis may be normal to the skew mirror surface. The skew mirror 205 is illuminated with the incident light 215 with an internal incidence angle that is measured with respect to the z-axis. The principal reflected light 220 may be reflected with internal reflection angle 180° measured with respect to the z-axis. The principal reflected light 220 may correspond to wavelengths of light residing in the red, green, and blue regions of the visible spectrum.

The skew mirror 205 may be characterized by the reflective axis 225, at an angle measured with respect to the z-axis. The z-axis is normal to the skew mirror axis 210. The skew mirror 205 is illuminated with the incident light 215 with an internal incidence angle that is measured with respect to the z-axis. The principal reflected light 220 may be reflected with internal reflection angle axis substantially normal to the surface of skew mirror 205. In some examples, the principal reflected light 220 may correspond to wavelengths of light residing in the red, green, and blue regions of the visible spectrum. For example, the red, green, and blue regions of the visible spectrum may include a red wavelength (e.g., 610-780 nm) band, green wavelength (e.g., 493-577 nm) band, and blue wavelength (e.g., 405-492 nm) band. In other examples, the principal reflected light 220 may correspond to wavelengths of light residing outside of the visible spectrum (e.g., infrared and ultraviolet wavelengths).

The skew mirror 205 may have multiple hologram regions which all share substantially the same reflective axis 225. These multiple regions, however, may each reflect light for different ranges of angles of incidence. For example, the bottom third of a HOE containing the skew mirror 205 may only contain that subset of grating structures that reflects light upwards towards a corresponding eye box. The middle third may then reflect light directly towards the corresponding eye box. Then the top third need only contain the subset of grating structures which reflects light downwards to the corresponding eye box.

Figure 2B:
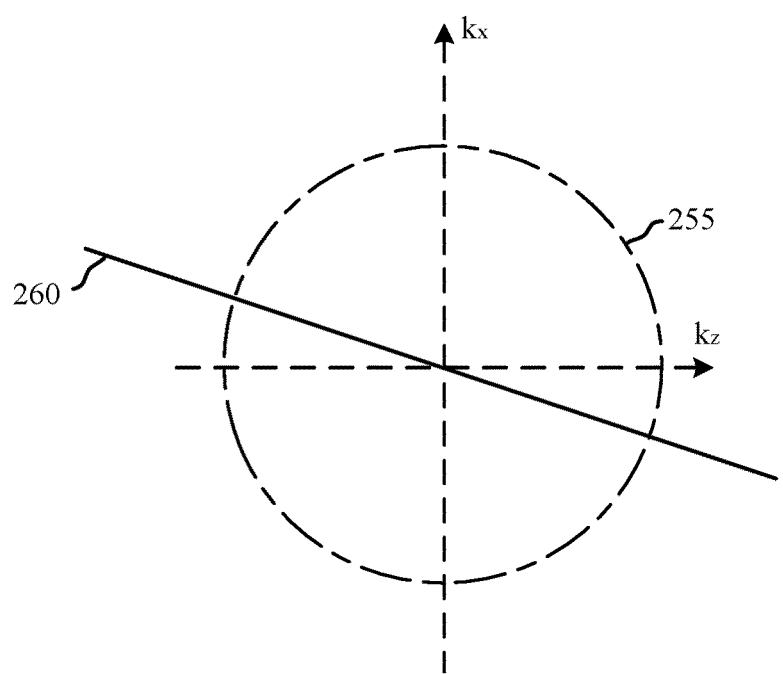
FIG. 2B illustrates a skew mirror in k-space in accordance with various aspects of the present disclosure.

FIG. 2B illustrates a k-space representation 250 of the skew mirror 205 of FIG. 2A. The k-space distributions of spatially varying refractive index components are typically denoted $\Delta n(\vec{k})$. $\Delta_n(\vec{k})$ k-space distribution 260 may pass through the origin, at an angle equal to reflective axis 225, measured with respect to the z-axis. Recording k-sphere 255 may be the k-sphere corresponding to a particular writing wavelength. K-space 250 may include various k-spheres corresponding to wavelengths of light residing in the red, green, and blue regions of the visible spectrum.

The k-space formalism may represent a method for analyzing holographic recording and diffraction. In k-space, propagating optical waves and holograms may be represented by three dimensional Fourier transforms of their distributions in real space. For example, an infinite collimated monochromatic reference beam may be represented in real space and k-space by equation (1):

$$E_r(\vec{r}) = A_r \exp(i\vec{k}_r \cdot \vec{r}) \xrightarrow{\mathcal{F}} E_r(\vec{k}) = A_r \delta(\vec{k} - \vec{k}_r), \tag{1}$$

where $E_r(\vec{r})$ is the optical scalar field distribution at all $\vec{r} = \{x, y, z\}$ 3D spatial vector locations, and the transform $E_r(\vec{k})$ of the distribution, is the optical scalar field distribution at all $\vec{k} = \{k_x, k_y, k_z\}$ 3D spatial frequency vectors. $A_r$ may represent the scalar complex amplitude of the field; and $\vec{k}_r$ may represent the wave vector, whose length indicates the spatial frequency of the light waves, and whose direction indicates the direction of propagation. In some implementations, all beams may be composed of light of the same wavelength, so all optical wave vectors may have the same length, i.e., $|\vec{k}| = k_n$. Thus, all optical propagation vectors may lie on a sphere of radius $k_n = 2\pi n_0/\lambda$, where $n_0$ is the average refractive index of the hologram ("bulk index"), and $\lambda$ is the vacuum wavelength of the light. This construct is known as the k-sphere. In other implementations, light of multiple wavelengths may be decomposed into a superposition of wave vectors of differing lengths, lying on different k-spheres.

Another important k-space distribution is that of the holograms themselves. Volume holograms may consist of spatial variations of the index of refraction within a grating medium. The index of refraction spatial variations, typically denoted $\Delta n(\vec{r})$, can be referred to as index modulation patterns, the k-space distributions of which may be denoted $\Delta n(\vec{k})$. The index modulation pattern may be created by interference between a first recording beam and a second recording beam is typically proportional to the spatial intensity of the recording interference pattern, as shown in equation (2):

$$\Delta n(\vec{r}) \propto |E_1(\vec{r}) + E_2(\vec{r})|^2 = |E_1(\vec{r})|^2 + |E_2(\vec{r})|^2 + E_1^*(\vec{r})E_2(\vec{r}) + E_1(\vec{r})E_2^*(\vec{r}), \tag{2}$$

where $E_1(\vec{r})$ is the spatial distribution of the signal first recording beam field and $E_2(\vec{r})$ is the spatial distribution of the second recording beam field. The unary operator * denotes complex conjugation. The final term in equation (2), $E_1(\vec{r})E_2^*(\vec{r})$, may map the incident second recording beam into the diffracted first recording beam. Thus the following equation may result:

$$E_1(\vec{r})E_2^*(\vec{r}) \xrightarrow{\mathcal{F}} E_1(\vec{k}) \otimes E_2(\vec{k}), \tag{3}$$

where $\otimes$ is the 3D cross correlation operator. This is to say, the product of one optical field and the complex conjugate of another in the spatial domain may become a cross correlation of their respective Fourier transforms in the frequency domain.

Typically, the hologram 230 constitutes a refractive index distribution that is real-valued in real space. Locations of Δn($\bar{k}$) k-space distributions of the hologram 230 may be determined mathematically from the cross-correlation operations $E_2(\bar{k})\otimes(\bar{k})$ and $E_1(\bar{k})\otimes E_2(\bar{k})$, respectively, or geometrically from vector differences $\bar{K}_{G+}=\bar{k}_1-\bar{k}_2$ and $\bar{K}_{G-}=\bar{k}_2-\bar{k}_1$, where $\bar{K}_{G+}$ and $\bar{K}_{G-}$ may represent grating vectors from the respective hologram Δn($\bar{k}$) k-space distributions to the origin (not shown individually). Note that by convention, wave vectors are represented by a lowercase "k," and grating vectors by uppercase "K."

Once recorded, the hologram 230 may be illuminated by a probe beam to produce a diffracted beam. For purposes of the present disclosure, the diffracted beam can be considered a reflection of the probe beam, which can be referred to as an incident light beam (e.g., image-bearing light). The probe beam and its reflected beam may be angularly bisected by the reflective axis 225 (i.e., the angle of incidence of the probe beam relative to the reflective axis has the same magnitude as the angle of reflection of the reflected beam relative to the reflective axis). The diffraction process can be represented by a set of mathematical and geometric operations in k-space similar to those of the recording process. In the weak diffraction limit, the diffracted light distribution of the diffracted beam is given by equation (4), $$E_d(\bar{k}) \propto \Delta n(\bar{k}) * E_p(\bar{k})|_{|\bar{k}|=k_n}, \quad (4)$$

where $E_d(\bar{k})$ and $E_p(\bar{k})$ are k-space distributions of the diffracted beam and the probe beam, respectively; and "*" is the 3D convolution operator. The notation "$|_{|\bar{k}|=k_n}$" indicates that the preceding expression is evaluated only where $|\bar{k}|=k_n$, i.e., where the result lies on the k-sphere. The convolution $\Delta n(k)*E_p(\bar{k})$ represents a polarization density distribution, and is proportional to the macroscopic sum of the inhomogeneous electric dipole moments of the grating medium induced by the probe beam, $E_p(\bar{k})$.

In some cases, when the probe beam resembles one of the recording beams used for recording, the effect of the convolution may be to reverse the cross correlation during recording, and the diffracted beam may substantially resemble the other recording beam used to record a hologram. When the probe beam has a different k-space distribution than the recording beams used for recording, the hologram may produce a diffracted beam that is substantially different than the beams used to record the hologram. Note also that while the recording beams are typically mutually coherent, the probe beam (and diffracted beam) is not so constrained. A multi-wavelength probe beam may be analyzed as a superposition of single-wavelength beams, each obeying Equation (4) with a different k-sphere radius.

Persons skilled in the art given the benefit of the present disclosure will recognize that the term probe beam, used when describing skew mirror properties in k-space, is analogous to the term incident light, which is used when describing skew mirror reflective properties in real space. Similarly, the term diffracted beam, used when describing skew mirror properties in k-space, is analogous to the term principal reflected light, used when describing skew mirror properties in real space. Thus when describing reflective properties of a skew mirror in real space, it may be typical to state that incident light is reflected by a hologram (or other grating structure) as principal reflected light, though to state that a probe beam is diffracted by the hologram to produce a diffracted beam is synonymous. Similarly, when describing reflective properties of a skew mirror in k-space, it is typical to state that a probe beam is diffracted by a hologram (or other grating structure) to produce a diffracted beam, though to state that incident light is reflected by the grating structure to produce principal reflected light has the same meaning in the context of implementations of the present disclosure.

Figure 3:
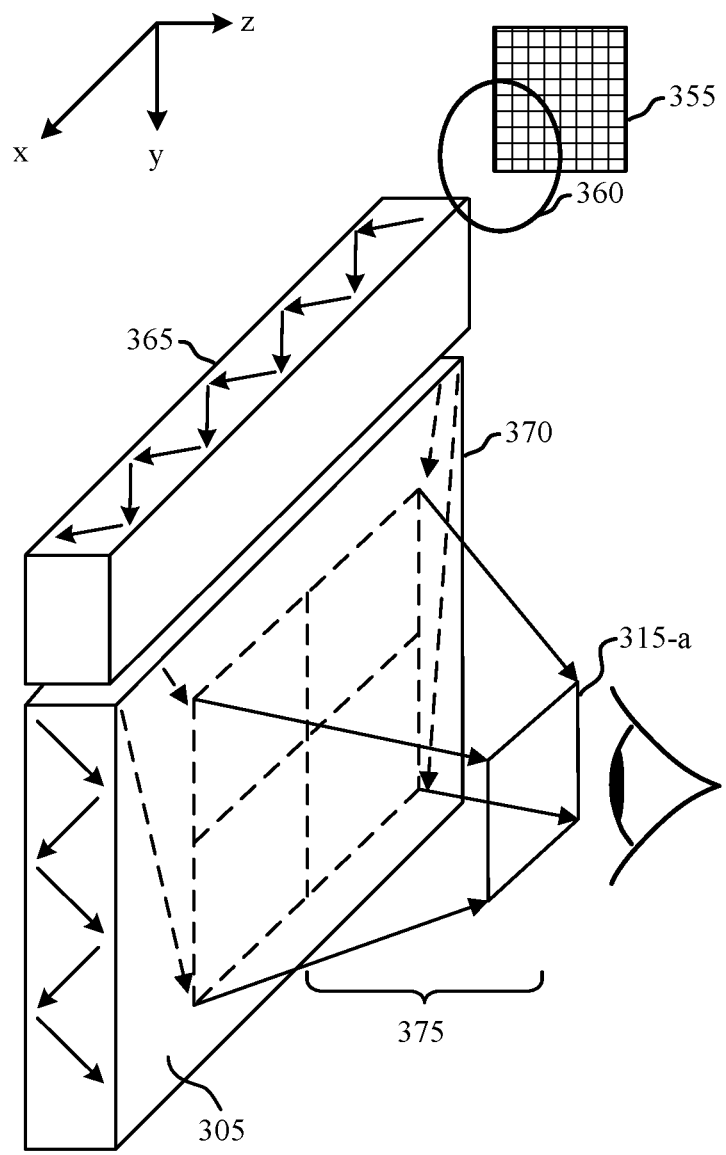
FIG. 3 is a diagram of an optical system incorporating skew mirror exit pupil expansion techniques in accordance with various aspects of the present disclosure.

FIG. 3 is a diagram of an optical system incorporating two-dimensional skew mirror exit pupil expansion techniques in accordance with various aspects of the disclosure. Optical system 300 may be utilized in an HMD, augmented reality (AR), or virtual reality (VR) application such as, but not limited to, the HMD 100 of FIG. 1. Optical system 300 may also be utilized in various optical coupling applications such as, but not limited to, large screen display and optical sensor applications. The optical system 300 may employ selective coupling to allow a skew mirror 305 to diffract light towards a specific location, such as an eye box 315-*a*, thereby improving photometric efficiency (e.g., image brightness). Selective coupling may have an advantageous effect of producing an external exit pupil at the eye box 315-*a*. The exit pupil may be a fixed distance from the skew mirror 305. An external exit pupil may increase optical efficiency relative to an internal exit pupil. The represented angles are internal angles relative to the surface normal of the grating medium, and that refraction at the grating medium and/or the substrate interface, as well as at the substrate air interface, is ignored for the purpose of illustration.

Optical system 300 may include a display 355, a collimator 360, a horizontal waveguide 365, a vertical waveguide 370, and an eye box 315-*a*. Eye box 315-*a* may be a distance from the vertical waveguide 370 hereby known as the eye relief 375. Optical system 300 illustrates an example of a two-dimensional pupil expander that may utilize skew mirrors. A skew mirror disposed in horizontal waveguide 365 may be referred to as a cross coupler. In some cases, a skew mirror disposed in the vertical waveguide 370 may be referred to as an output coupler.

The exit pupil expansion techniques as described may be used to provide two-dimensional pupil expansion by utilizing two skew mirrors. For example, a horizontal waveguide 365 may include a first skew mirror that is operatively coupled to a second skew mirror. The first skew mirror may be used to expand the pupil in a horizontal direction. In some examples, the first skew mirror (e.g., a cross coupler) may be disposed within a separate 2D (duct-type) waveguide. The second skew mirror may be used to expand the pupil in a vertical direction. In some examples, the second skew mirror (e.g., an output coupler) may be disposed within a separate 1D (slab-type) waveguide. In some examples, the first skew mirror (e.g., a cross coupler) and the second skew mirror (e.g., an output coupler) may be disposed within a single 1D (slab-type) waveguide. In some examples, the first skew mirror and the second skew mirror may abut or be otherwise operatively coupled vertically (e.g., along the y-axis). In some examples, the first skew mirror and the second skew mirror may abut or be otherwise operatively coupled horizontally (e.g., along the x-axis). In some examples, the first skew mirror and the second skew mirror may abut or be otherwise operatively coupled in an overlapping manner (e.g., along the z-axis).

In some examples, the first skew mirror (e.g., a cross coupler) may employ selective coupling to implement the exit pupil equalization techniques as described herein. In some examples, the second skew mirror (e.g., an output coupler) may independently employ selective coupling to implement the exit pupil equalization techniques as described herein.

Figure 4:
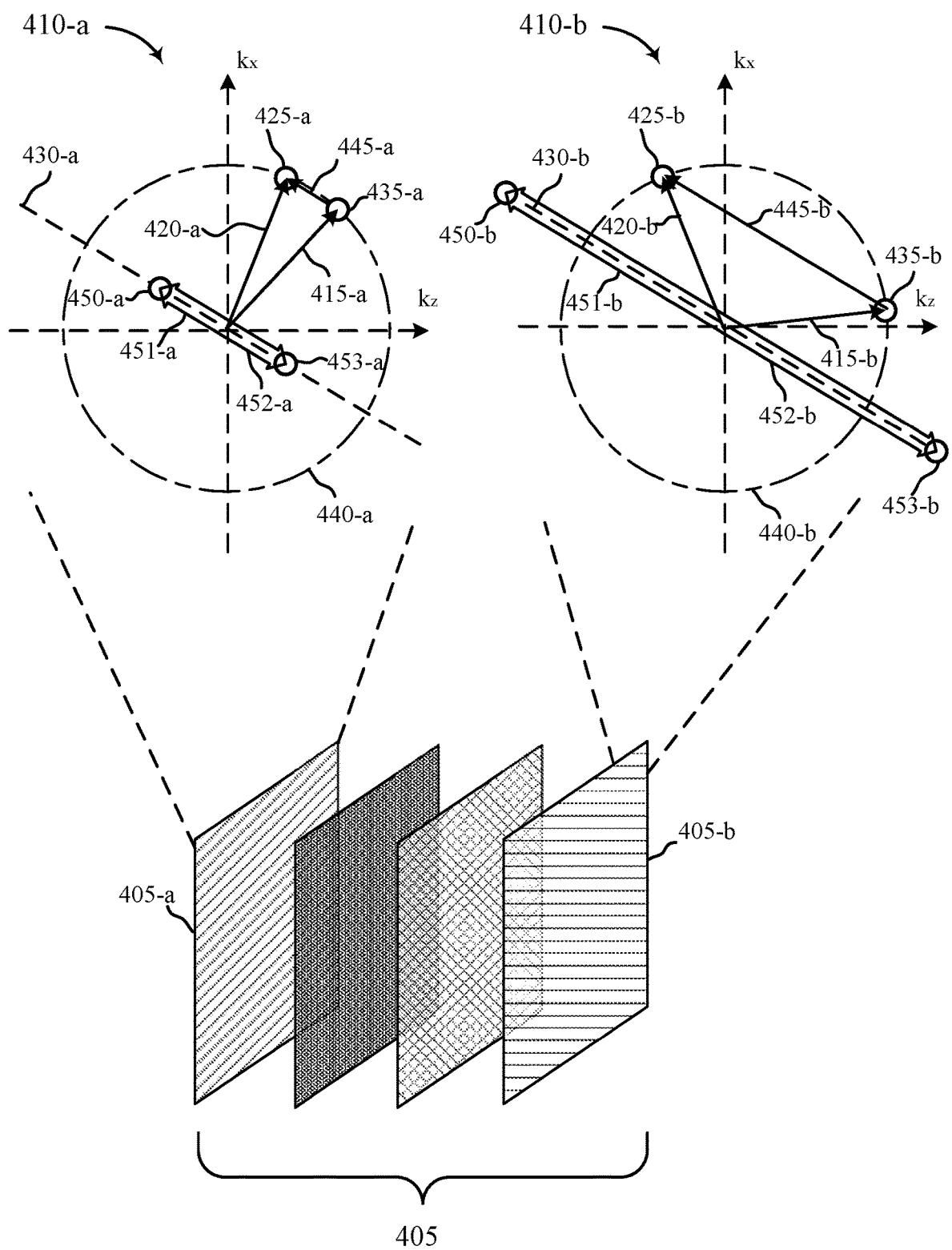
FIG. 4 is a diagram of an optical component illustrating a plurality of grating structures in accordance with various aspects of the present disclosure.

FIG. 4 is a diagram of an optical component 400 illustrating a plurality of grating structures 405. Grating structures 405 may be similar to the grating structures with a grating medium described herein. Grating structures 405 are illustrated in an exploded view manner for discussion purposes, but these grating structures 405 may overlap and intermingle within a volume or space of a grating medium as described herein. Also, each grating structure may have a different diffraction angle response and may reflect light at a wavelength that is different than another grating structure.

Optical component 400 depicts a grating structure 405-a and a grating structure 405-b. The grating structure 405-a may have a corresponding k-space diagram 410-a, and the grating structure 405-b may have a corresponding k-space diagram 410-b. The k-space diagrams 410-a and 410-b may illustrate cases of Bragg-matched reconstruction by illuminating a hologram.

The k-space diagram 410-a may illustrate the reflection of an incident light by the grating structure 405-a. The k-space diagram 410-a is a representation of a mirror-like diffraction (which can be referred to as a reflection) of the probe beam by the hologram, where the probe beam angle of incidence with respect to the reflective axis is equal to the diffracted beam angle of reflection with respect to the reflective axis. The k-space diagram 410-a may include positive sideband $\Delta n(\vec{k})$ k-space distribution 450-a that has an angle measured with respect to the z-axis, equal to that of the reflective axis 430-a of the grating structure 405-a. The k-space diagram 410-a may also include a negative sideband $\Delta n(\vec{k})$ k-space distribution 453-a that has an angle measured with respect to the z-axis, equal to that of the reflective axis 430-a. The k-sphere 440-a may represent visible blue light, visible green light, or visible red light.

The k-space diagram 410-a depicts a case where probe beam 435-a produces a diffracted beam k-space distribution 425-a, $E_d(\vec{k})$, that is point-like and lies on the probe beam k-sphere 440-a. The diffracted beam k-space distribution 425-a is produced according to the convolution of Equation (4).

The probe beam may have a k-space distribution 435-a, $E_p(\vec{k})$, that is also point-like. In this case, the probe beam is said to be "Bragg-matched" to the hologram, and the hologram may produce significant diffraction, even though the probe beam wavelength differs from the wavelength of the recording beams used to record the hologram. The convolution operation may also be represented geometrically by the vector sum $\vec{k}_d = \vec{k}_p + \vec{K}_{G+}$, where $\vec{k}_d$ represents a diffracted beam wave vector 420-a, $\vec{k}_p$ represents a probe beam wave vector 415-a, and $\vec{K}_{G+}$ represents a positive sideband grating vector 451-a. Vector 445-a represents the sum of the probe beam wave vector 415-a and the positive sideband grating vector 451-a according to the convolution of Equation (4). The k-space diagram 410-a also has a negative sideband grating vector 452-a.

The probe beam wave vector 415-a and the diffracted beam wave vector 420-a may form the legs of a substantially isosceles triangle. The equal angles of this triangle may be congruent with the angle of incidence and angle of reflection, both measured with respect to the reflective axis 430-a. Thus, the grating structure 405-a may reflect light in a substantially mirror-like manner about the reflective axis 430-a.

The k-space diagram 410-b may illustrate the reflection of an incident light by the grating structure 405-b. The grating structure 405-b may reflect incident light at a plurality of incidence angles that are different than the incidence angles reflected by the grating structure 405-a. The grating structure 405-b may also reflect light at a different wavelength than that of the grating structure 405-a. The k-space diagram 410-b may be a representation of a mirror-like diffraction (which can be referred to as a reflection) of the probe beam by the hologram, where the probe beam angle of incidence with respect to the reflective axis is equal to the diffracted beam angle of reflection with respect to the reflective axis. The k-space diagram 410-b has a positive sideband $\Delta n(\vec{k})$ k-space distribution 450-b that has an angle measured with respect to the z-axis, equal to that of the reflective axis 430-b of grating structure 405-b. The k-space diagram 410-b also has a negative sideband $\Delta n(\vec{k})$ k-space distribution 453-b that has an angle measured with respect to the z-axis, equal to that of the reflective axis 430-b. The k-sphere 440-b may represent visible blue light, visible green light, or visible red light. In some embodiments, the k-sphere may represent other wavelengths of electromagnetic radiation, including but not limited to ultraviolet or infrared wavelengths.

The k-space diagram 410-b depicts a case where the probe beam 435-b produces a diffracted beam k-space distribution 425-b, $E_d(\vec{k})$, that is point-like and lies on the probe beam k-sphere 440-b. The diffracted beam k-space distribution 425-b is produced according to the convolution of Equation (4).

The probe beam 435-b has a k-space distribution, $E_p(\vec{k})$, that is also point-like. In this case, the probe beam is said to be "Bragg-matched" to the hologram, and the hologram may produce significant diffraction, even though the probe beam wavelength differs from the wavelength of the recording beams used to record the hologram. The convolution operation may also be represented geometrically by the vector sum $\vec{k}_d = \vec{k}_p + \vec{K}_{G+}$, where $\vec{k}_d$ represents a diffracted beam wave vector 420-b, $\vec{k}_p$ represents a probe beam wave vector 415-b, and $\vec{K}_{G+}$ represents a positive sideband grating vector 451-b. Vector 445-b represents the sum of the probe beam wave vector 415-b and the positive sideband grating vector 451-b according to the convolution of Equation (4). The k-space diagram 410-b also has a negative sideband grating vector 452-b.

The probe beam wave vector 415-b and the diffracted beam wave vector 420-b may form the legs of a substantially isosceles triangle. The equal angles of this triangle may be congruent with the angle of incidence and angle of reflection, both measured with respect to the reflective axis 430-b. Thus, the grating structure 405-b may reflect light in a substantially mirror-like manner about the reflective axis 430-b.

Figure 5A:
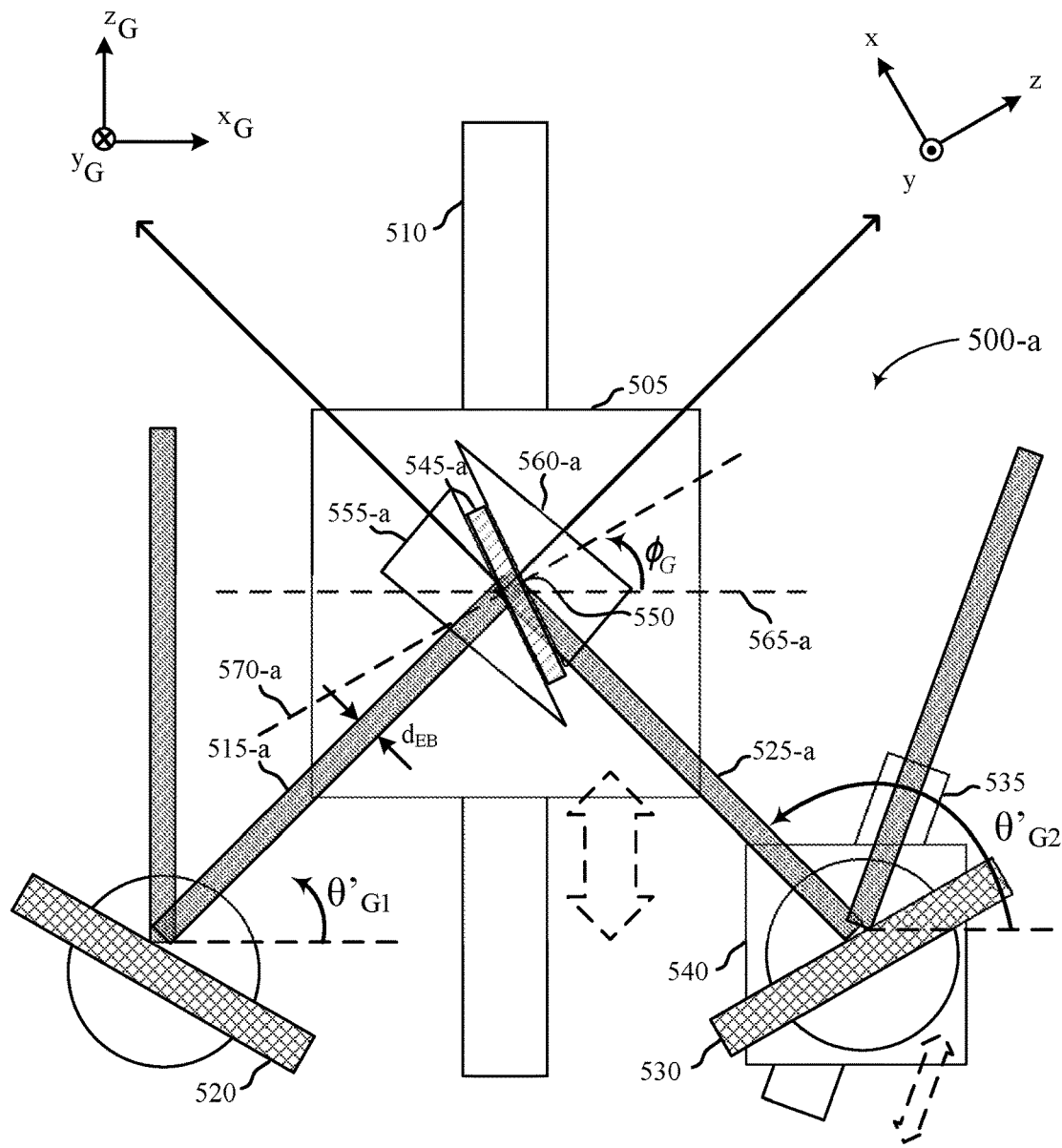
FIG. 5A illustrates a diagram of a system that can be used to manufacture a skew mirror with pupil expansion in accordance with various aspects of the present disclosure.

FIG. 5A is a system 500-a for manufacturing a skew mirror with pupil equalization in accordance with various aspects of the disclosure. System 500-a may include a sample stage carrier 505, a sample carrier rail 510, a first recording beam 515-a, a signal mirror 520, a second recording beam 525-a, a reference mirror 530, a reference mirror carrier rail 535, a reference mirror carrier 540, a grating medium 545-a, a hologram 550, a first prism 555-a, and a second prism 560-a.

System 500-a may include global coordinates ($x_G$, $y_G$, $z_G$) and skew mirror coordinates (x, y, z). The origin may be defined to be in the center of the grating medium 545-a. In some cases, the grating medium 545-a may comprise a generally rectangular shape where 'z' corresponds to the thickness of the grating medium 545-a, 'x' corresponds to the length of the in-plane side of the grating medium 545-a, and 'y' corresponds to the length of the in-plane side of the grating medium 545-a. The global angle for recording, $\theta_G$, may be defined as the angle of the first recording beam 515-a with respect to the $x_G$-axis inside grating medium 545-a.

Skew mirror coordinates (x, y, z) may be converted to global coordinates by the following equation:

$$\begin{bmatrix} x_G \\ y_G \\ z_G \end{bmatrix} = \begin{bmatrix} \sin\phi_G & 0 & \cos\phi_G \\ 0 & -1 & 0 \\ \cos\phi_G & 0 & -\sin\phi_G \end{bmatrix} \begin{bmatrix} x \\ y \\ z \end{bmatrix} \qquad (8)$$

The system 500-*a* may be used to configure recording beams to have a size approximately equal to a desired eye box size. In an implementation, the system 500-*a* may dispose rotating mirrors such as the signal mirror 520 and the reference mirror 530 to create the correct angles for the first recording beam 515-*a* and the second recording beam 525-*a*. The angle of the signal mirror 520 may be changed to produce a desired angle ($\theta_{G1}$) of first recording beam 515-*a* with width ~$d_{EB}$. The sample stage carrier 505 and the reference mirror carrier 540 may be positioned so as to illuminate the correct location with the recording beams for each exposure. The sample stage carrier 505 of the system 500-*a* may be positioned on the sample carrier rail 510 to facilitate the illumination of the grating medium 545-*a* with the first recording beam 515-*a* in the desired location. The reference mirror carrier 540 may be positioned on the reference mirror carrier rail 535 to facilitate the illumination of the grating medium 545-*a* with the second recording beam 525-*a* in the desired location. The grating medium 545-*a* may be referred to as a recording medium prior to or during hologram recording, and may include a photopolymer. In some embodiments, the grating medium may comprise photorefractive crystals, dichromatic gelatin, photo-thermo-refractive glass, and/or film containing dispersed silver halide particles.

With the rotation of the signal mirror 520 and the reference mirror 530 set, the mirrors may be arranged to direct the first recording beam 515-*a* and the second recording beam 525-*a* such that the recording beams intersect and interfere with each other to form an interference pattern that is recorded as a hologram 550 in the grating medium 545-*a*. The hologram 550 may be an example of a grating structure. The system 500-*a* may form multiple grating structures, each configured to reflect light of a particular wavelength about the skew axis 565-*a* at a plurality of incidence angles. Each grating structure may be formed using a plurality of exposures of the grating medium 545-*a* to coherent light having a particular wavelength. The plurality of incidence angles corresponding to each grating structure may be offset from one another by a minimum range of angles.

In some implementations, the recording beams may have widths that differ from each other, or they may be the same. The recording beams may each have the same intensity as each other, or intensity can differ among the beams. The intensity of the beams may be non-uniform. The grating medium 545-*a* is typically secured in place between the first prism 555-*a* and the second prism 560-*a* using a fluid index matched to both the prisms and the grating medium. A skew axis 565-*a* resides at a skew angle relative to the surface normal 570-*a*. As depicted in FIG. 5A, skew angle may be −30.25 degrees relative to the surface normal 570-*a*. The angle between the first and second recording beams may reside in a range from 0 to 180 degrees. The recorded skew angle relative to surface normal 570-*a* then becomes $\phi' = (\theta_{R1}+\theta_{R2}-180°)/2+\phi_G$ for in-plane system 500-*a*. For the nominal case where $\theta_{G2}=180°-\theta_{G1}$, $\phi'=\phi_G$. In FIG. 5, $\phi_G$ shows the nominal skew angle relative to surface normal. Additionally, in FIG. 5, the exact depiction of angles of $\theta_{G1}$ and $\theta_{G2}$ are not shown. The angles of $\theta'_{G1}$ and $\theta'_{G2}$ are illustrated and correspond to the angles of $\theta_{G1}$ and $\theta_{G2}$. The angles of $\theta_{G1}$ and $\theta_{G2}$ are in relation to the first recording beam 515-*a* and the second recording beam 525-*a* beam, respectively, within the first prism 555-*a* and the second prism 560-*a*. The angles of $\theta'_{G1}$ and $\theta'_{G2}$ will be different from angles of $\theta_{G1}$ and $\theta_{G2}$ because of an index of refraction mismatch at the boundary between air and the prisms when the recording beams enter the prisms (e.g., the effects of Snell's Law or the law of refraction).

The first recording beam 515-*a* and the second recording beam 525-*a* may be nominally symmetrical about the skew axis 565-*a* such that the sum of first recording beam internal angle relative to the skew axis and the second recording beam internal angle relative to the skew axis equates to 180 degrees. Each of the first and second recording beams may be collimated plane wave beams originating from a laser light source.

Refraction at air/prism boundaries, for example where the first recording beam 515-*a* intersects an air/prism boundary of the first prism 555-*a* and where the second recording beam 525-*a* intersects an air/prism boundary of the second prism 560-*a*, is shown figuratively rather than strictly quantitatively. Refraction at the prism/grating medium boundary may also occur. In implementations, the grating medium and prisms each have an index of refraction of approximately 1.5471 at the recording beam wavelength of 405 nm.

A skew angle for a hologram (including a mean skew angle for a collection of holograms) can be substantially identical to a reflective axis angle, meaning the skew angle or mean skew angle is within 1.0 degree of the reflective axis angle. Given the benefit of the present disclosure, persons skilled in the art will recognize that the skew angle and reflective axis angle can be theoretically identical. However, due to limits in system precision and accuracy, shrinkage of recording medium that occurs during recording holograms, and other sources of error, the skew angle or mean skew angle as measured or estimated based on recording beam angles may not perfectly match the reflective axis angle as measured by incidence angles and reflection angles of light reflected by a skew mirror. Nevertheless, a skew angle determined based on recording beam angles can be within 1.0 degree of the reflective axis angle determined based on angles of incident light and its reflection, even where medium shrinkage and system imperfections contribute to errors in estimating skew angle and reflective axis angle. It is understood that these medium shrinkage and system imperfections can be made arbitrarily small in the manufacture of skew mirrors with pupil equalization. In this regard, these medium shrinkage and system imperfections may be considered analogous to flatness of an ordinary or conventional mirror. In some examples, a fundamental limit associated with the manufacture of skew mirrors using volume holograms may be based on thickness of the recording medium.

A skew axis/reflective axis is generally called a skew axis when referring to making a skew mirror (for example when describing recording a hologram in a skew mirror grating medium), and as a reflective axis when referring to light reflective properties of a skew mirror. A skew angle for a hologram (including a mean skew angle for a collection of holograms) can be substantially identical to a reflective axis angle, meaning the skew angle or mean skew angle is within 1.0 degree of the reflective axis angle. Persons skilled in the art given the benefit of the present disclosure will recognize that the skew angle and reflective axis angle can be theoretically identical. However, due to limits in system precision and accuracy, shrinkage of recording medium that occurs during recording holograms, and other sources of error, the skew angle or mean skew angle as measured or estimated based on recording beam angles may not perfectly match the reflective axis angle as measured by incidence angles and reflection angles of light reflected by a skew mirror. Nevertheless, a skew angle determined based on recording beam angles can be within 1.0 degree of the reflective axis angle determined based on angles of incident light and its reflection, even where medium shrinkage and system imperfections contribute to errors in estimating skew angle and reflective axis angle. Given the benefit of the present disclosure, persons skilled in the art will recognize that the skew angle for a given hologram is the same as the grating vector angle for that hologram.

In a variation of the system 500-a, a variable wavelength laser may be used to vary the wavelength of the first and second recording beams. Incidence angles of the first and second recording beams may be, but are not necessarily, held constant while the wavelength of the first and second recording beams is changed. Wavelengths may be comprised of visible red light wavelength, visible blue light wavelength, visible green light wavelength, ultraviolet (UV) wavelength, and/or infrared (IR) wavelength. Each grating structure of the system 500-a may reflect an incidence angle at a wavelength that is different than another grating structure. The system 500-a may have reflective properties that allow it to reflect light at a substantially different wavelength, and in particular a considerably longer wavelength, than the recording beam wavelength.

Figure 5B:
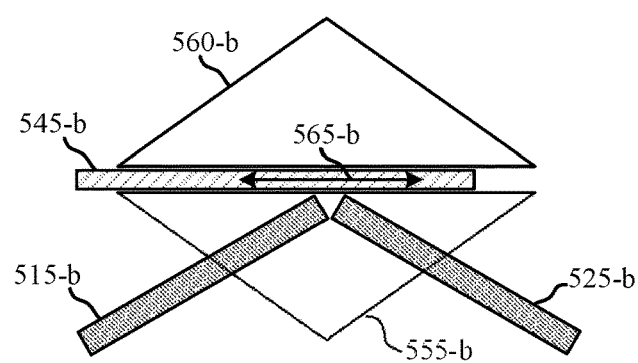
FIG. 5B illustrates a diagram of a system that can be used to manufacture a skew mirror with pupil expansion in accordance with various aspects of the present disclosure.

FIG. 5B is a system 500-b for manufacturing a skew mirror with pupil equalization in accordance with various aspects of the disclosure. System 500-b may include a first recording beam 515-b, a second recording beam 525-b, a grating medium 545-b, a first prism 555-b, a second prism 560-b, and skew axis 565-b. System 500-b may be an expanded view in reference to embodiments discussed in reference to FIG. 5A.

In some cases, one or more skew mirrors may be fabricated for a light coupling device used as a cross coupler. For example, each reflective axis may be either parallel or angularly offset to the surfaces of the one or more waveguides within the pupil expander. For example, a cross coupler having a crossed skew mirror cross coupler configuration may be fabricated by re-orienting the grating medium 545-b within the first prism 555-b and the second prism 560-b. In some recording implementations, the second prism 560-b may be omitted and replaced with a component for securing or stabilizing the grating medium 545-b. The component for securing or stabilizing the grating medium 545-b that may also include light absorbing characteristics. For example, the first recording beam 515-b and the second recording beam 525-b may both enter the first prism 555-b when configuring a cross coupler.

In some cases, a second skew mirror orientation may be recorded on the re-oriented grating medium 545-b. The second skew mirror may be oriented in an at least partially overlapping, or non-overlapping manner with the first skew mirror. Thus, a cross skewed mirror configuration is formed in a given volume of the grating medium 545-b (i.e., the recording medium after reorienting and curing processes). The re-orienting process may be repeated to record all desired skew axes of the light coupling device. In some cases, the second skew mirror may be oriented in a non-overlapping manner with the first skew mirror.

Figure 6:
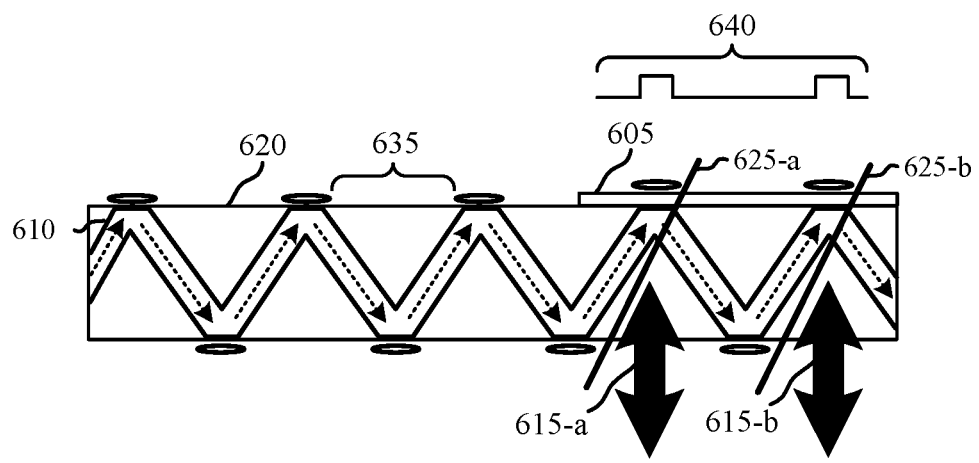
FIG. 6 illustrates an example of an optical system that supports pupil expansion in accordance with aspects of the present disclosure.

FIG. 6 illustrates an example of an optical system 600 that supports pupil expansion in accordance with various aspects of the present disclosure. Optical system 600 may be utilized in an application such as, but not limited to, an HMD device. The optical system 600 may employ selective coupling to allow a light coupling device 605 to reflect light 610 towards a specific location and project replicated pupils 615-a and 615-b. The represented angles are internal angles relative to the surface normal of the waveguide 620, and the refraction at the substrate interface, as well as at the substrate air interface, is ignored for the purpose of illustration. Replicated pupils 615-a and 615-b may project an image corresponding to reflective axis 625-a and 625-b, respectively. Light coupling device 605 may include a grating medium and a grating structure within the grating medium. The grating structure may have a plurality of holograms or sinusoidal volume gratings.

Optical system 600 illustrates light 610 propagating in a TIR mode in the waveguide 620 from another portion of the optical system 600. In order for light 610 to be reflected towards the light coupling device 605 and project replicated pupils 615-a and 615-b, light 610 may propagate through the waveguide 620 by total internal reflection. For example, light 610 may propagate through waveguide 620 and reflect between a downward mode direction and an upward mode direction. Light 610 may be an example of light from one pixel (e.g., an image point) and have a corresponding width (e.g., the pupil width). In some examples, light 610 may be an example of light from multiple pixels.

In some cases, reflected light 610 in a TIR device may experience mode inhomogeneity. For example, gap 635 caused by TIR modes (e.g., spatial modes along a direction of propagation) of the light may be present between the consecutive interactions of light and the surface of the waveguide. In some cases, propagating light 610 having large angles of incidence with respect to surface normal of waveguide 620 may increase the size of gap 635 between the interaction of light 610 and waveguide 620. Depending on a size of gap 635 caused by coupled mode of light 610, light 610 reflecting within waveguide 620 may only partially interact with light coupling device 605. This partial interaction in the non-overlapping mode inhomogeneity example of FIG. 6 may cause a non-uniform intensity profile at the light coupling device 605. The non-uniform intensity profile may result in a spatially-inhomogeneous power distribution 640. The spatially-inhomogeneous power distribution 640 may cause a broadening of the point spread function (PSF) of an output beam associated with replicated pupils of the light coupling device 605 thereby reducing the resolution of the projected image. In some examples, light homogenization techniques may be applied to optical system 600.

In some examples, light coupling device 605 may include a grating medium and a grating structure within the grating medium. The grating structure may have a plurality of holograms or sinusoidal volume gratings.

Figure 7A:
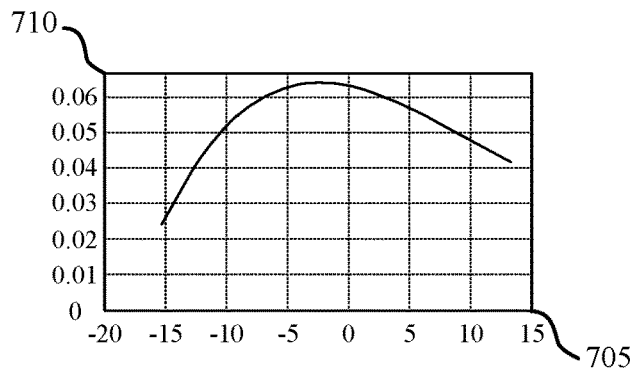
FIG. 7A is a plot that shows conventional techniques in contrast to the pupil expansion techniques described herein in accordance with various aspects of the present disclosure.

FIG. 7A is a plot 700-a that shows conventional techniques in contrast to the pupil expansion techniques described herein in accordance with various aspects of the present disclosure. Plot 700-a includes reflected angle measured in external degrees on axis 705 and diffraction efficiency on axis 710. A conventional output coupler, excluding the implementation using skew mirror technology, may experience external FOV limitations. In some cases, an output coupler may achieve an external FOV proportional (<1) to a limited TIR angle range within a light coupling system. For example, at a bulk index of refraction of 1.5, an external FOV may correspond to 0.7 times the TIR angle range (e.g., from a few degrees greater than the critical angle of a waveguide portion to 15 degrees parallel to the substrates of the waveguide portion) of the light coupling system. Ideally, TIR rays may be angle limited to a range between 41.8 degrees and 90 degrees. Based on the TIR angle range, the conventional coupler may produce an external FOV of approximately 29 degrees. However, commonly the TIR angle range for a conventional output coupler may be limited to a range between 41.8 degrees and 78 degrees further constraining the emitted external FOV.

Figure 7B:
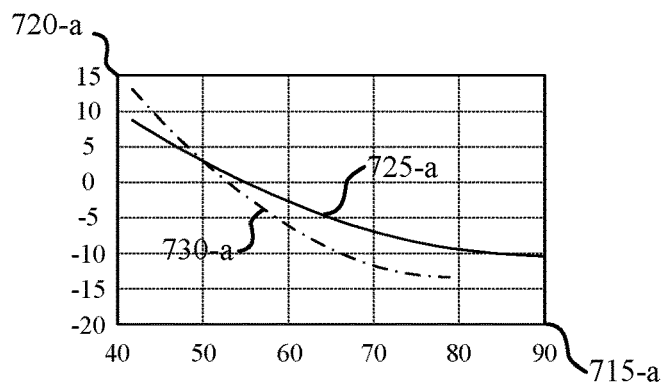
FIG. 7B is a plot that shows conventional techniques in contrast to the pupil expansion techniques described herein in accordance with various aspects of the present disclosure.

FIG. 7B is a plot 700-b that shows conventional techniques in contrast to the pupil expansion techniques described herein in accordance with various aspects of the present disclosure. Plot 700-b includes TIR angle measured in degrees on axis 715-a and FOV angle measured in degrees on axis 720-a. Plot line 725-a of plot 700-b illustrates an example of the internal FOV range. Plot line 730-a of plot 700-b illustrates an example of the external FOV range. For example, FIG. 7B may illustrate both the internal and external FOV range produced by a conventional output coupler. The internal FOV range produced by the conventional output may correspond to a TIR ray angle range between 41.8 degrees and 90 degrees. However, the external FOV range produced by the conventional output may be limited to a corresponding TIR ray angle range between 41.8 degrees and 78 degrees. In some cases, plot 700-b may correspond to couplers of one or more characteristics (e.g., DOEs and HOEs).

In some embodiments, other conventional couplers including embossed diffractive gratings, DOEs, and angled partially reflective surfaces may impose distinct limitations on FOV. In some cases, other conventional couplers may incur FOV limitations due to interaction between the coupler and multiple reflections of each TIR mode. For example, conventional couplers may incur reduced optical clarity as a result of interactions between straight through light and the coupling element. Other conventional couplers (e.g., DOEs and HOEs) may experience chromatic dispersion by the coupler elements. By contrast, some volumetric holograms and skew mirror type components or devices may be Bragg-mismatched to one of the reflections (e.g., a downward bounce toward a substrate that is proximal to an eye box a light coupling system) of light operating in a TIR mode. As a result, some FOV limitations applicable to conventional couplers may not be incurred by volumetric holograms. Some volumetric holograms and skew mirror type components or devices may be Bragg-mismatched to input light passing straight through the light coupling system (e.g., external or environmental light incident on a substrate surface).

Light coupling devices utilizing skew mirror type components or devices may be substantially achromatic and therefore may not suffer chromatic dispersion like conventional couplers. Based at least in part on the aforementioned qualities of light coupling devices utilizing skew mirror type components or devices, an output coupler using skew mirror technology may achieve an external FOV subject to a higher proportionality of the TIR angle range. An output coupler using skew mirror technology may achieve an internal FOV equal to the TIR angle range because the internal range of incidence angles at the coupler is equivalent to the internal range of the reflection angles. For example, at a bulk index of refraction of 1.5, an external FOV may be approximately 1.5 times the TIR angle range of a light coupling system. As such, the result may be an external FOV significantly larger in comparison to a conventional output coupler. A TIR angle range of 34.9 degrees (e.g., an internal range within a waveguide portion of the light coupling system) may produce an external FOV of 53.4 degrees.

Figure 7C:
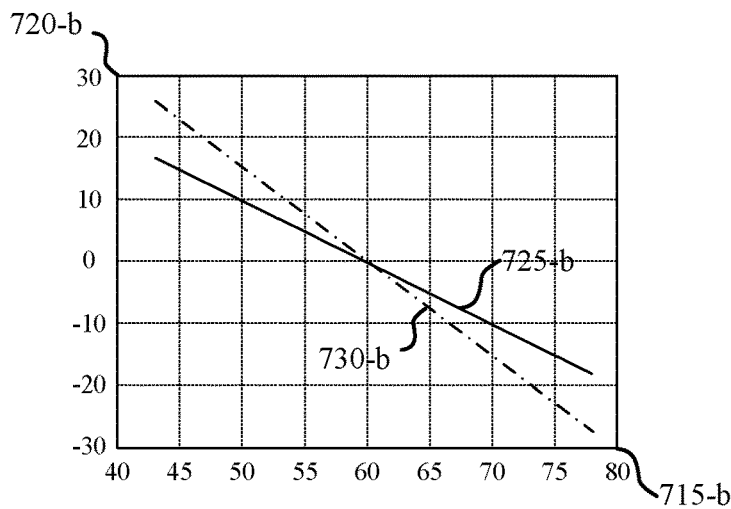
FIG. 7C is a plot that illustrates pupil expansion techniques in accordance with various aspects of the present disclosure.

FIG. 7C illustrates a plot 700-c that illustrates pupil expansion techniques in accordance with various aspects of the present disclosure. Plot 700-c includes TIR angle measured in degrees on axis 715-b and FOV angle measured in degrees on axis 720-b. Plot line 725-b of plot 700-c illustrates an example of the internal FOV range. Plot line 730-b of plot 700-c illustrates an example of the external FOV range. For example, FIG. 7C may illustrate both the internal and external FOV range produced by an output coupler using skew mirror technology, in accordance with an angle range between 43 degrees and 78 degrees.

In some embodiments, the external FOV of an output coupler using skew mirror technology is a linear FOV, as seen in plot line 730-b. The output coupler may therefore support a larger diagonal field for the output image projection than a conventional output coupler. In an example light coupling system orientation (e.g., with a cross coupler disposed horizontally with respect to the output coupler), a 16:9 display field with an external FOV of 53.4 degrees in the horizontal direction may support a vertical FOV of 31.6 degrees and a diagonal FOV of 60 degrees. In an example, a light coupling system orientation (e.g., with a cross coupler disposed vertically with respect to the output coupler), a 16:9 display field with an external FOV of 53.4 degrees in the vertical direction may support a horizontal FOV of 83.9 degrees and a diagonal FOV of 91.7 degrees. Other display field implementations such as, but not limited to, a square display field may be supported by light coupling system orientations utilizing skew mirror technology.

Figure 8A:
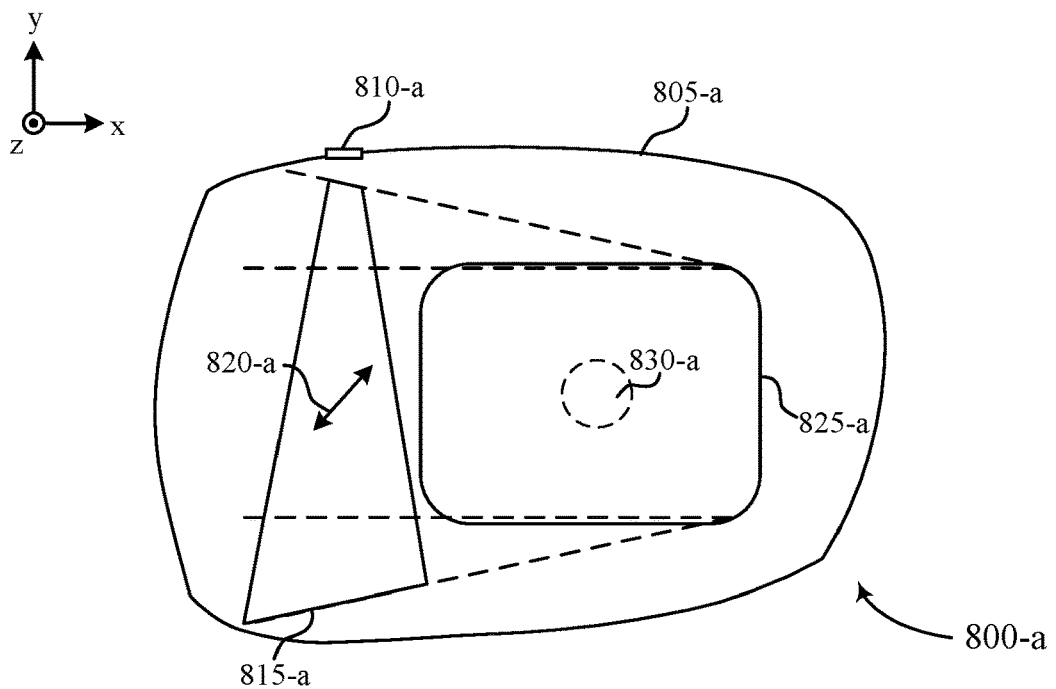
FIG. 8A illustrates an example of an optical lens that supports pupil expansion in accordance with various aspects of the present disclosure.

FIG. 8A illustrates an example of an optical lens 800-a that supports pupil expansion in accordance with various aspects of the present disclosure. The optical lens 800-a may include waveguide 805-a, light input section 810-a, first light coupling device 815-a (e.g., cross coupler), reflective axis 820-a, second light coupling device 825-a (e.g., output coupler) and eye box 830-a. Waveguide 805-a may also include another light coupling device (e.g., an input coupler); however, the input coupler is ignored for the purpose of illustration. Waveguide 805-a may include a first and second surface parallel to each other, a light receiving end proximal to the light input section 810-a, and a light output end distal to the light input section 810-a.

In some cases, input light may be in-coupled at the light input section 810-a and propagated through a waveguide 805-a. For example, light input section 810-a may be edge coupled to the waveguide 805-a. In other examples, light input section 810-a may be prism coupled, coupled by a DOE, HOE, or skew mirror based input coupler, or the like (not shown). Input light may be guided by waveguide 805-a within an orientation plane (e.g., the x-y plane) of the light coupling device to expand from an aperture of the light input section 810-a with a divergence angle (e.g., with a 20.4 degree divergence angle) filling the first light coupling device 815-a (e.g., a cross coupler using skew mirror techniques having a general pie shape configuration). The first light coupling device 815-a may comprise a grating medium and a plurality of grating structures within the grating medium. In some cases, the first light coupling device 815-a may comprise a partially reflective skew mirror, with a reflective axis 820-a oriented at 45 degrees in the x-y plane. The first light coupling device 815-a, in accordance with the reflective axis 820-a, may reflect the waveguided light at the first light coupling device 815-a toward the second light coupling device 825-a (e.g., output coupler) at an angle offset from the propagation direction of the input light. Light may propagate through the second light coupling device 825-a and reflect toward the eye box 830-a, mapping the internal TIR angle range to an emitted external FOV represented at the eye box. For example, a 34.9 degree TIR angle range may be mapped to an external horizontal FOV of 53.4 degrees, and an in-plane internal angle range of 20.4 degrees may be mapped into an external vertical FOV of 31.6 degrees, resulting in a 60 degree diagonal FOV.

In some cases, reflective axis 820-a of the first light coupling device 815-a may be parallel to a waveguide surface (e.g., a major substrate surface of the waveguide 805-a). Due to a parallel orientation with the waveguide surface, the reflective axis 820-a of the first light coupling device 815-a may sustain the out-of-plane direction component of diffracted (or reflected) light. By sustaining directionality of the diffracted light in the out-of-plane dimension, the first light coupling device 815-a may diffract both of the bidirectional (e.g., upward and downward) TIR reflections to the second light coupling device 825-a. As a result, pupil replication density may be increased.

In other cases, reflective axis 820-a of the first light coupling device 815-a may sustain an out-of-plane component, allowing for unidirectional TIR reflection to the second light coupling device 825-a. That is, the out-of-plane component of the reflective axis 820-a may allow the first light coupling device 815-a to reflect the diffracted light in the out-of-plane direction, similar to a TIR reflection. For example, incident light at an incidence angle of 45 degrees with respect to the out-of-plane direction may be reflected toward an second light coupling device 825-a (e.g., an output coupler using skew mirror techniques) at an angle of 135 degrees with respect to the out-of-plane direction.

The first light coupling device 815-a may allow a dimension of the projected image to remain unguided through the path from the light input section 810-a to the eye box 830-a. In some cases, first light coupling device 815-a may be lateral to the second light coupling device 825-a. The unguided dimension may be the vertical FOV, which includes a smaller FOV range than the maximum TIR range. Alternatively, in some cases, the first light coupling device 815-a may configured at an alternate location of the second light coupling device 825-a (e.g. along the bottom or top of the second light coupling device 825-a). The unguided dimension may be the horizontal FOV, and the FOV may span an angular range which exceeds the maximum TIR range. For example, the first light coupling device 815-a may be disposed vertically with respect to the second light coupling device 825-a on a portion of the light coupling system. Using a vertical FOV having a maximum guided external 53.4 degree FOV, a 16:9 display field may subtend 83.9 degrees horizontally and 91.7 degrees diagonally.

Inventive aspects of the present disclosure are illustrated by the non-limiting examples of FIG. 8A. For example, a waveguide may have a first waveguide surface and a second waveguide surface parallel to the first waveguide surface. A first volume holographic light coupling element (e.g., first light coupling device 815-a) may be disposed between the first waveguide surface and the second waveguide surface. The first volume holographic light coupling element may be configured or structured to reflect at least a portion of incident light as reflected light. The incident light in the waveguide may have a first angle of incidence within a TIR range with respect a first axis (e.g., z-axis) corresponding to a surface normal of the waveguide and a second angle of incidence with respect to a second axis (e.g., x-axis or y-axis). The first volume holographic light coupling element may have a first reflective axis (e.g., reflective axis 820-a) that is oriented on a plane parallel to the first waveguide surface. The reflected light may have a first angle of reflection within the TIR range and a second angle of reflection with respect to the second axis. In some cases, the second angle of reflection may be different from the second angle of incidence.

In some cases, a second volume holographic light coupling element (e.g., second light coupling device 825-a) may be disposed between the first waveguide surface and the second waveguide surface. The second volume holographic light coupling element may have a second reflective axis oriented different from the first reflective axis. In some cases, the second reflective axis may be oriented orthogonal to the first reflective axis. As illustrated in the example of FIG. 8A, the first reflective axis 820-a is orthogonal to surface normal of waveguide 805-a. Conversely, in some embodiments the first reflective axis is not orthogonal to a waveguide surface normal, and in some embodiments the second reflective axis is not orthogonal to the first reflective axis. The second reflective axis is typically not coincident with surface normal.

In some cases, the first volume holographic light coupling element may have a grating medium and a first grating structure within the grating medium. The first grating structure may be configured to reflect light of a wavelength about the first reflective axis at a first incidence angle. The first volume holographic light coupling element may also include a second grating structure within the grating medium at least partially non-overlapping with the first grating structure where the second grating structure may be configured to reflect light of the wavelength about the first reflective axis medium at a second incidence angle different from the first incidence angle.

The first grating structure may comprise at least three holograms where each of the at least three holograms correspond to a unique incidence angle within the first range of incidence angles, and where an adjacent $|\Delta K_G|$ for the at least three holograms may have a mean value that resides between $1.0 \times 10^4$ and $1.0 \times 10^6$ radians per meter (rad/m). In some cases, the wavelength may comprise one of a visible red light wavelength, a visible blue light wavelength, or a visible green light wavelength.

Additional examples and various implementations are contemplated using the pupil equalization techniques described herein.

Figure 8B:
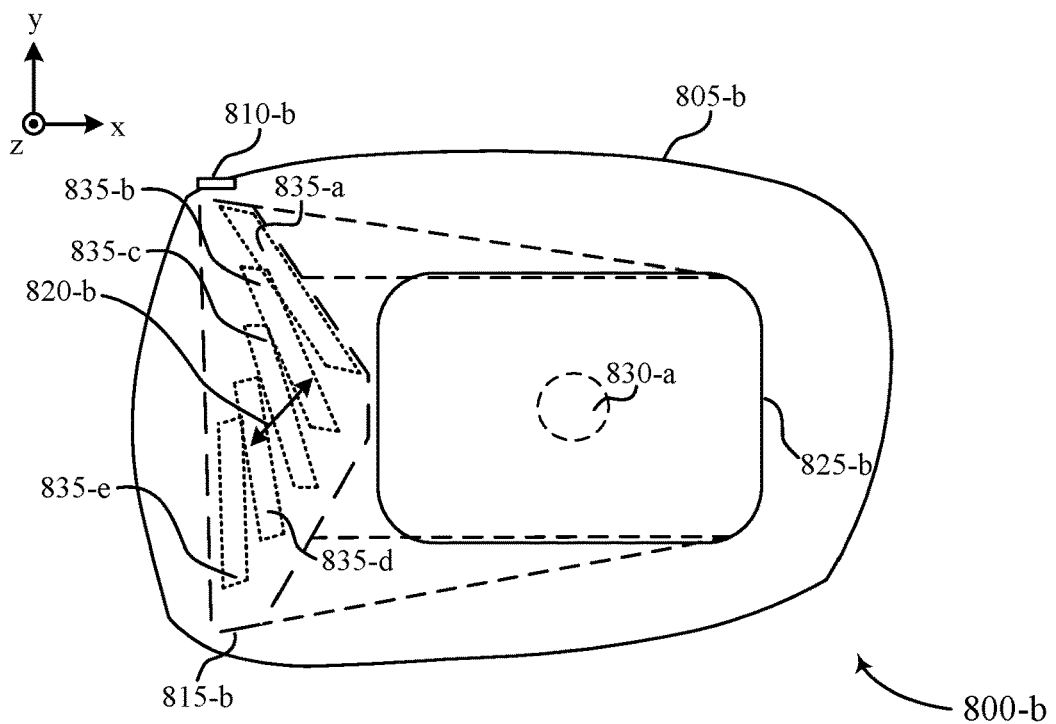
FIG. 8B illustrates an example of an optical lens that supports pupil expansion in accordance with various aspects of the present disclosure.

FIG. 8B illustrates an example of an optical lens 800-b that supports pupil expansion in accordance with various aspects of the present disclosure. The optical lens 800-b may include waveguide 805-b, light input section 810-b, first light coupling device 815-b (e.g., cross coupler), reflective axis 820-b, second light coupling device 825-b (e.g., output coupler), eye box 830-b, and loci 835. Waveguide 805-b may also include another light coupling device (e.g., an input coupler); however, the input coupler is ignored for the purpose of illustration. Waveguide 805-b may include a first and second surface parallel to each other and a light receiving end proximal to the light input section 810-a and a light output end distal to the light input section 810-b.

In some embodiments, the first light coupling device 815-b (e.g., a cross coupler using skew mirror techniques having coupler components arranged in a banana configuration) may contain a locus 835-a of the loci 835 that correspond to at least some differing vertical field angles or differing vertical field angle ranges than each other locus 835-b, 835-c, 835-d, 835-e of the loci 835. Each locus 835-a, 835-b, 835-c, 835-d, 835-e of the loci 835 may be an example of a grating structure to reflect light of a particular vertical field angle to direct the light to the second light coupling device 825-b (e.g., an output coupler using skew mirror techniques). The first light coupling device 815-*b* may comprise a grating medium and a plurality of grating structures within the grating medium. The first light coupling device 815-*b* may include partially reflective skew mirror components having a reflective axis 820-*b* in the x-y plane of 50.1 degrees with respect to the x-axis. The first light coupling device 815-*b* may be oriented so that the furthest corners are equidistant from the second light coupling device 825-*b*, thus minimizing the required size of the first light coupling device 815-*b*.

In some cases, the loci 835 of the first light coupling device 815-*b* may correspond to the partially reflective skew mirror components. For example, input light may enter the light input section 810-*b* and be guided by waveguide 805-*b* within an orientation plane (e.g., the x-y plane) of the coupler, and propagate to at least one locus (e.g., locus 835-*a*) of loci 835 of the first light coupling device 815-*b*. The partially reflective skew mirror components may reflect the light, and the light may propagate in a direction toward the second light coupling device 825-*b*. The light may then be further reflected by the second light coupling device 825-*b* (e.g., directed toward the eye box 830-*b*).

Each locus each locus 835-*a*, 835-*b*, 835-*c*, 835-*d*, 835-*e* of the loci 835 of the first light coupling device 815-*b* may reflect a portion of image light from the light input section 810-*b* toward the second light coupling device 825-*b*. In some cases, the portion of image light reflected by a particular locus 835-*a*, 835-*b*, 835-*c*, 835-*d*, 835-*e* may correspond to a horizontal row of the image subsequently projected to the eye box 830 of a light coupling system. For example, a portion of image light corresponding to a top horizontally-extending edge portion of the subsequently projected image may be reflected toward the second light coupling device 825-*b* by a first locus 835-*a* (e.g., a topmost locus) proximal to the light input section 810-*b* (e.g., locus 835-*a* may include one or more holograms that reflect incident light of the TIR range at a higher incidence angle and a lower grating frequency than other holograms of the remaining locus 835-*b*, 835-*c*, 835-*d*, 835-*e* of the loci 835). In other examples, a portion of image light corresponding to a bottom edge of the subsequently projected image may be reflected toward the second light coupling device 825-*b* by another locus 835-*e* (e.g., a bottommost locus) distal from the light input section 810-*b*. The five locus 835-*a*, 835-*b*, 835-*c*, 835-*d*, 835-*e* illustrated in the non-limiting example of FIG. 8B may correspond to 100%, 75%, 50%, 25%, and 0% vertical field angles, in ascending order from bottom locus 835 to top locus 835 (i.e., a radial sweep of the internal vertical FOV angle field). In some cases, at least one locus (e.g., locus 835-*a*) comprises one or more holograms at first radial distance from a center of the light input section 810-*b* and another locus (e.g., locus 835-*e*) does not include holograms at the first radial distance from the center of the light input section 810-*b*. In some cases, the number of locus of loci 835 may be greater than the number of degrees in the internal vertical FOV angle field. For example, an optical system with a 20.4 degree internal vertical FOV may include more than twenty loci. In some cases, each locus corresponds to a single hologram. In some cases, a first hologram corresponding to a first locus includes fringe patterns that are non-overlapping with a second hologram corresponding to a second locus.

In some examples, a lower right portion where a light coupling device may have a general pie shape configuration may be omitted as the corresponding holograms have angle selectivity to the top edge portion of the subsequently projected image. Holograms that may have angle selectivity for image light corresponding to other horizontally-extending portions of the subsequently projected image may be located at a position that is relatively proximal to the second light coupling device 825-*b*. The vertical size of the bottom loci 835 may be smaller by limiting the vertical area that any particular locus 835 must subtend. Thus, a more compact first light coupling device 815-*b* may be constructed.

First light coupling device 815-*b* may allow a dimension of the projected image to remain unguided through the path from the light input section 810-*b* to the eye box 830-*b*. In some cases, first light coupling device 815-*b* may be lateral to second light coupling device 825-*b*. The unguided dimension may be the vertical FOV, which includes a smaller FOV range than the maximum TIR range. Alternatively, in some cases, the first light coupling device 815-*b* may be configured at an alternate location of the second light coupling device 825-*b* (e.g. along the bottom or top of second light coupling device 825-*b*). The unguided dimension may be the vertical FOV, and the FOV may span an angular range which exceeds the maximum TIR range. For example, first light coupling device 815-*b* may be disposed vertically with respect to the second light coupling device 825-*b* on a portion of the light coupling system. Using a vertical FOV having a maximum guided external 53.4 degree FOV, a 16:9 display field may subtend 83.9 degrees horizontally and 91.7 degrees diagonally.

Inventive aspects of the present disclosure are illustrated by the non-limiting examples of FIG. 8B. For example, a waveguide may have a first waveguide surface and a second waveguide surface parallel to the first waveguide surface. A first volume holographic light coupling element (e.g., first light coupling device 815-*b*) may be disposed between the first waveguide surface and the second waveguide surface. The first volume holographic light coupling element may be configured or structured to reflect at least a portion of incident light as reflected light. The incident light in the waveguide may have a first angle of incidence within a TIR range with respect a first axis (e.g., z-axis) corresponding to a surface normal of the waveguide and a second angle of incidence with respect to a second axis (e.g., x-axis or y-axis). The first volume holographic light coupling element may have a first reflective axis (e.g., reflective axis 820-*b*) that is oriented on a plane parallel to the first waveguide surface (e.g., the first reflective axis may be oriented orthogonal with respect to a surface normal of the first waveguide surface). The reflected light may have a first angle of reflection within the TIR range and a second angle of reflection with respect to the second axis. In some cases, the second angle of reflection may be different from the second angle of incidence.

In some cases, a second volume holographic light coupling element (e.g., second light coupling device 825-*b*) may be disposed between the first waveguide surface and the second waveguide surface. The second volume holographic light coupling element may have a second reflective axis that is oriented on a plane orthogonal to the plane on which the first reflective axis is oriented.

A waveguide may have a first locus (e.g., locus 835-*a*) disposed in the first volume holographic light coupling element, where the first locus may be configured to reflect light of a wavelength about the first reflective axis at a first incidence angle. In some cases, a waveguide may have a second locus (e.g., locus 835-*b*) disposed in the first volume holographic light coupling element, where the second locus may be configured to reflect light of wavelength about the first reflective axis at a second incidence angle different from the first incidence angle. The first locus and the second locus may at least partially overlap.

Additional examples and various implementations are contemplated using the pupil equalization techniques described herein.

Figure 9A:
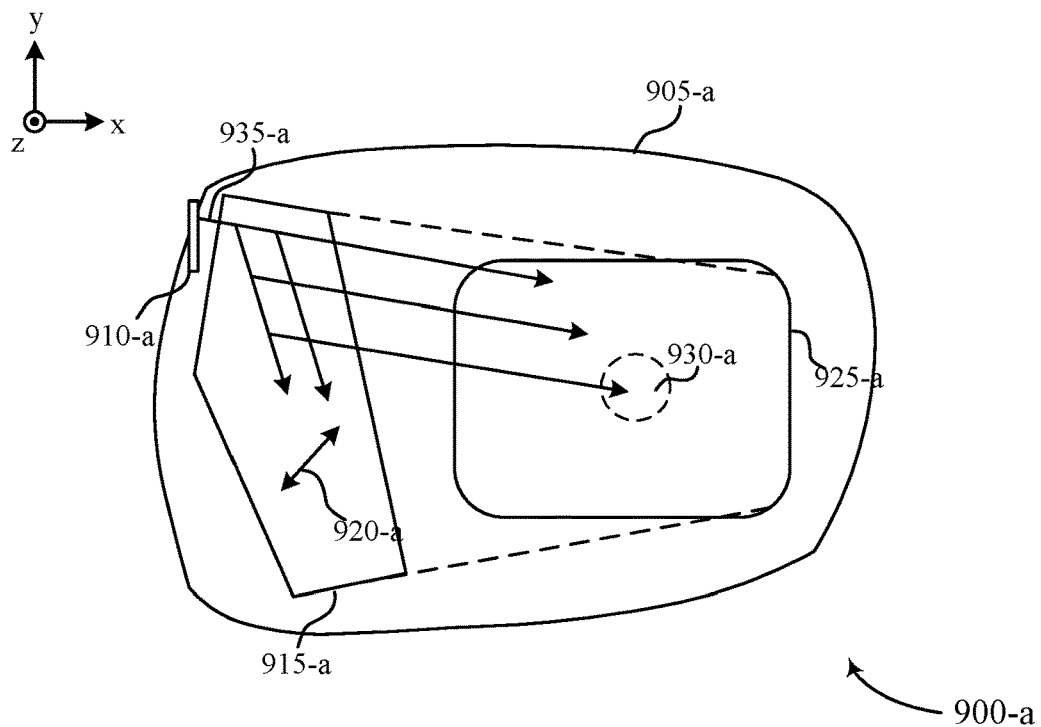
FIG. 9A illustrates an example of an optical lens that supports pupil expansion in accordance with various aspects of the present disclosure.

FIG. 9A illustrates an example of an optical lens 900-*a* that supports pupil expansion in accordance with various aspects of the present disclosure. The optical lens 900-*a* may include waveguide 905-*a*, light input section 910-*a*, first light coupling device 915-*a* (e.g., cross coupler), reflective axis 920-*a*, second light coupling device 925-*a* (e.g., output coupler), and eye box 930-*a*. Waveguide 905-*a* may also include another light coupling device (e.g., an input coupler); however, the input coupler is ignored for the purpose of illustration. Waveguide 905-*a* may include a first and second surface parallel to each other and a light receiving end proximal to the light input section 910-*a* and a light output end distal to the light input section 910-*a*.

In some embodiments, the first light coupling device 915-*a* (e.g., a cross coupler using skew mirror techniques and a periscope reflectivity configuration) may include an even number of diffractions to reflect incident light 935-*a* toward the second light coupling device 925-*a* (e.g., an output coupler using skew mirror techniques). Input light 935-*a* may enter the light input section 910-*a* (e.g., an entrance pupil). In some cases, the input light 935-*a* may propagate in a first direction through the first light coupling device 915-*a* and may be reflected by a first partially reflective component (e.g., a hologram) creating a first reflected ray and a first transmitted ray. The first reflected ray may propagate in a second direction through the first light coupling device 915-*a* and may be reflected by a second partially reflective component creating a second reflected ray that may be propagated in the first direction parallel to the original direction of light propagation.

In some cases, each diffraction of the first light coupling device 915-*a* may correspond to replications of the same grating within the skew mirror, allowing for incident light reflection analogous to a parallel mirror orientation. Light 935-*a* may propagate in a first direction through first light coupling device 915-*a* and be reflected by a first partially reflective component, oriented with regard to skew axis 920-*a*. A ray reflected from the first partially reflective component may propagate within the first light coupling device 915-*a* and subsequently be reflected by a second partially reflective component, of common orientation with the first partially reflective component and skew axis 920-*a*, emitting a ray that may be propagated in the original direction of input light 925-*a*.

In some cases, reflective axis 920-*a* of the first light coupling device 915-*a* may be parallel to a waveguide surface (e.g., a major substrate surface of the waveguide 905-*a*). Due to a parallel orientation with the waveguide surface, the reflective axis 920-*a* of the first light coupling device 915-*a* may sustain the out-of-plane direction component of diffracted light. By sustaining directionality of the diffracted light in the out-of-plane dimension, the first light coupling device 915-*a* may diffract both of the bidirectional (e.g., upward and downward) TIR reflections to the second light coupling device 925-*a*. As a result, pupil replication density may be increased.

In some examples, the reflective axis may have an out-of-plane component, allowing for unidirectional TIR reflection to the second light coupling device 925-*a*. The out-of-plane component of the reflective axis may allow the skew mirror to reflect the diffracted light in the out-of-plane direction, similar to a TIR reflection. For example, incident light at angle of 45 degrees with respect to the out-of-plane direction may be reflected toward the second light coupling device at an angle of 125 degrees with respect to the out-of-plane direction.

Inventive aspects of the present disclosure are illustrated by the non-limiting examples of FIG. 9A. For example, a waveguide may have a first waveguide surface and a second waveguide surface parallel to the first waveguide surface. A first volume holographic light coupling element (e.g., first light coupling device 915-*a*) may be disposed between the first waveguide surface and the second waveguide surface. The first volume holographic light coupling element may have a first reflective axis (e.g., reflective axis 920-*a*) that is oriented on a plane parallel to the first waveguide surface.

In some cases, a second volume holographic light coupling element (e.g., second light coupling device 925-*a*) may be disposed between the first waveguide surface and the second waveguide surface. The second volume holographic light coupling element may have a second reflective axis that is oriented on a plane orthogonal to the plane on which the first reflective axis is oriented.

Additional examples and various implementations are contemplated using the pupil equalization techniques described herein.

Figure 9B:
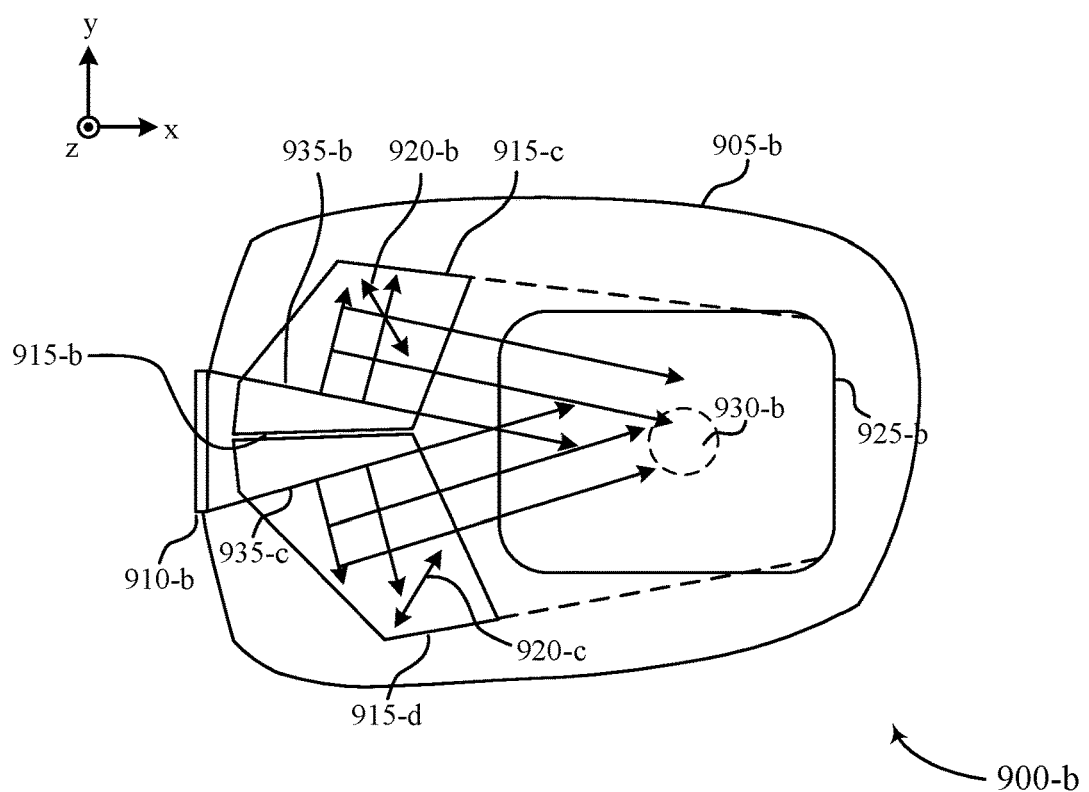
FIG. 9B illustrates an example of an optical lens that supports pupil expansion in accordance with various aspects of the present disclosure.

FIG. 9B illustrates an example of an optical lens 900-*b* that supports pupil expansion in accordance with various aspects of the present disclosure. The optical lens 900-*b* may include waveguide 905-*b*, light input section 910-*b*, first light coupling device 915-*b* (e.g., cross coupler), reflective axis 920-*b*, second light coupling device 925-*b* (e.g., output coupler), and eye box 930-*b*. Waveguide 905-*b* may also include another light coupling device (e.g., an input coupler); however, the input coupler is ignored for the purpose of illustration. Waveguide 905-*b* may include a first and second surface parallel to each other and a light receiving end proximal to the light input section 910-*b* and a light output end distal to the light input section 910-*b*.

The first light coupling device 915-*b* may include a first light coupling component 915-*c* and a second light coupling component 915-*d* (e.g., two cross coupler sections using skew mirror techniques in a periscope configuration). The first coupling component 915-*c* and the second coupling component 915-*d* may generally abut at an edge of each that is proximal to the light input section 910-*b*. The light input section 910-*b* (e.g., entrance pupil) may be oriented with respect to an edge center of the first light coupling device 915-*b*. This orientation may allow for an expanded entrance pupil. In some cases, a gap may be located between the abutting or adjacent edge portions of the first coupling component 915-*c* and second coupling component 915-*d*. In other examples, the edge portions of the first coupling component 915-*c* and second coupling component 915-*d* may overlap.

Input light may enter light input section 910-*b* and guided to first light coupling device 915-*b*. Light 935-*b* may be directed to light coupling component 915-*c* of the coupling device, and propagate to a first partially reflective component within light coupling component 915-*c*, oriented with regard to skew axis 920-*b*. A ray reflected from the first partially reflective component may propagate within the light coupling component 915-*c* and subsequently be reflected by a second partially reflective component, of common orientation with the first partially reflective component and skew axis 920-*b*, emitting a ray that may be propagated in the original direction of the guided input light 935-*b*. The emitted light may be directed to the second light coupling device 925-*b*.

Similarly, light 935-*c* may be directed to light coupling component 915-*d*, and propagate to a first partially reflective component within light coupling component 915-*d*, oriented with regard to skew axis 920-*c*. A ray reflected from the first partially reflective component may propagate within the light coupling component 915-*d* and subsequently be reflected by a second partially reflective component, of common orientation with the first partially reflective component and skew axis 920-*c*, emitting a ray that may be propagated in the original direction of the guided input light 935-*c*. The emitted light may be directed to second light coupling device 925-*b*.

Inventive aspects of the present disclosure are illustrated by the non-limiting examples of FIG. 9B. For example, a waveguide may have a first waveguide surface and a second waveguide surface parallel to the first waveguide surface. A first volume holographic light coupling element (e.g., first light coupling device 915-*a*) may be disposed between the first waveguide surface and the second waveguide surface. The first volume holographic light coupling element may have a first reflective axis (e.g., reflective axis 920-*a*) that is oriented on a plane parallel to the first waveguide surface.

In some cases, a second volume holographic light coupling element (e.g., second light coupling device 925-*a*) may be disposed between the first waveguide surface and the second waveguide surface. The second volume holographic light coupling element may have a second reflective axis that is oriented on a plane orthogonal to the plane on which the first reflective axis is oriented.

In some cases, the first volume holographic light coupling element may comprise a first coupling portion (e.g., first coupling component 915-*c*) that may be configured to reflect light about the first reflective axis (e.g., reflective axis 920-*b*) and a second coupling portion (e.g., second coupling component 915-*d*) that may be configured to reflect light about a second reflective axis (e.g., reflective axis 920-*c*) oriented on a plane parallel to the first waveguide surface, the second reflective axis being non-parallel to the first reflective axis. The first reflective axis may be configured to reflect light at a first location and the second reflective axis may configured to reflect light at a second location, where the first location may be different than the second location.

In some examples, the first coupling portion may at least partially overlap the second coupling portion such that the first reflective axis may be configured to reflect light at an overlapping location and the second reflective axis may be configured to reflect light at the overlapping location. The first coupling portion of the volume holographic light coupling element and the second coupling portion of the volume holographic light coupling element may align at a joint.

In some examples, an entrance pupil element (e.g., light input section 910-*b*) may be aligned with the joint of the first coupling portion and the second coupling portion such that the entrance pupil element extends over the first coupling portion and the second coupling portion. The first coupling portion of the volume holographic light coupling element and the second coupling portion of the volume holographic light coupling element may at least partially overlap.

Additional examples and various implementations are contemplated using the pupil equalization techniques described herein.

Figure 10A:
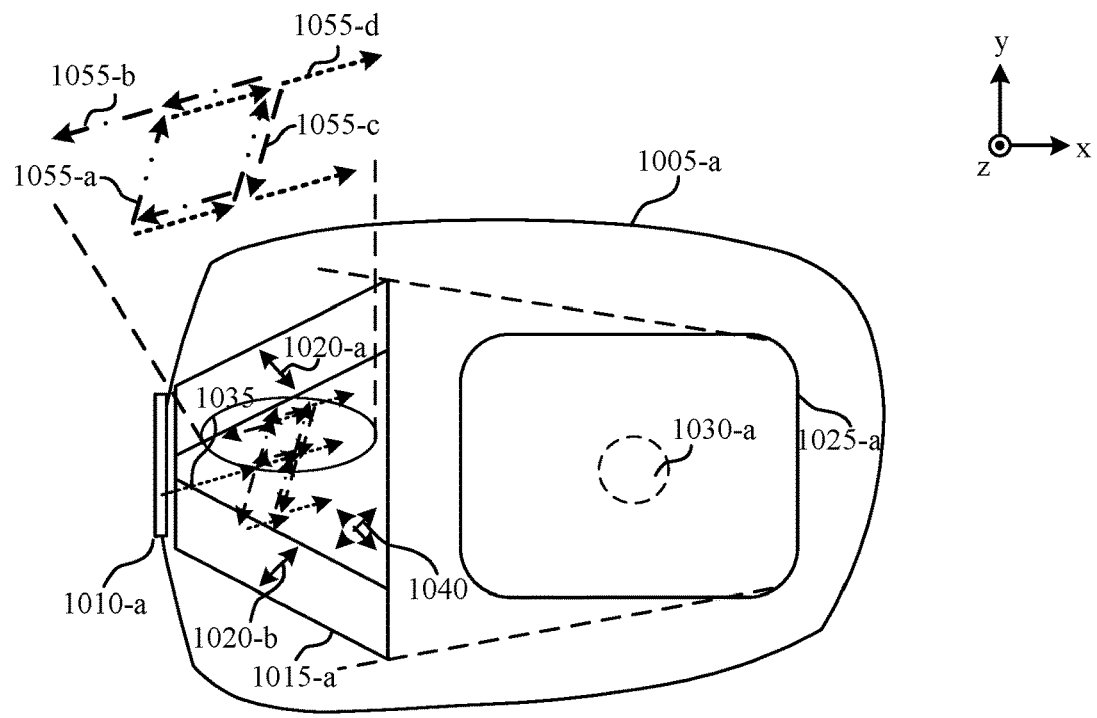
FIG. 10A illustrates an example of an optical lens that supports pupil expansion in accordance with various aspects of the present disclosure.

FIG. 10A illustrates an example of an optical lens 1000-*a* that supports pupil expansion in accordance with various aspects of the present disclosure. The optical lens 1000-*a* may include waveguide 1005-*a*, light input section 1010-*a*, first light coupling device 1015-*a* (e.g., cross coupler), reflective axes 1020-*a* and 1020-*b*, second light coupling device 1025-*a* (e.g., output coupler), and eye box 1030-*a*. Waveguide 1005-*a* may also include another light coupling device (e.g., an input coupler); however, the input coupler is ignored for the purpose of illustration. Waveguide 1005-*a* may include a first and second surface parallel to each other and a light receiving end proximal to the light input section 1010-*a* and a light output end distal to the light input section 1010-*a*. In some embodiments, a pair of periscope couplers may be configured to overlap and comprise a first light coupling device 1015-*a*. The overlapped region may encompass the entire area of the first light coupling device 1015-*a*, or may be limited to a sub-region of the first light coupling device 1015-*a*. Each periscope cross coupler may contain a multiplicity of grating structures, allowing for a superposition of grating structures of the device. The overlapped region may incorporate a superposition of reflective axes 1020-*a* and 1020-*b* forming a cross skew axis orientation 1040. The reflective axes 1020-*a* and 1020-*b* of the grating structures may be orthogonal within the overlapped region of the first light coupling device 1015-*a*. In some examples, the reflective axes 1020-*a* and 1020-*b* of the grating structures may be parallel to the surfaces of the waveguide 1005-*a*. In other examples, the reflective axes 1020-*a* and 1020-*b* of the grating structures may have an out-of-plane component, allowing for unidirectional TIR to the second light coupling device 1025-*a*.

An orthogonal configuration of the grating structures, according to crossed skew axis orientation 1040, may implement mode diffusion. Within waveguide 1005-*a*, each light ray may represent a complementary TIR pair, sharing a common orientation plane (e.g., x-y plane) with opposing angles in or out of the orientation plane (i.e., upward and downward TIR reflections with respect to the z-axis). The complementary TIR pair may represent a pair of guided modes within the waveguide 1005-*a*, propagating at both horizontal and vertical complements of the orientation axis. The guided modes of the complementary pair may propagate in a common direction of the first light coupling device 1015-*a* and partially or entirely fill the superposition of grating structures within the overlapped region of first light coupling device 1015-*a*, producing a total of eight coupled modes of the cross skew axis orientation 1040.

Input light 1035 at non-overlapping portions of the first light coupling device 1015-*a*, may propagate to one or more partially reflective components, oriented according to reflective axis 1020-*a* or 1020-*b*. Reflected rays of the partially reflective components may propagate toward the crossed skew mirror region, minimizing the amount of light divergent from the second light coupling device 1025-*a*.

Due to the orientation of the grating structures, any light introduced into one of the coupled modes may diffract to populate each of the modes. Each input light ray may be reflected and diffracted to reproduce a light ray directionally aligned with the input light ray, according to a direction restriction of the first light coupling device 1015-*a*. The reproduced light ray may occur at a spatial location not illuminated by the original input light ray, constituting pupil expansion Inventive aspects of the present disclosure are illustrated by the non-limiting examples of FIG. 10A. For example, a waveguide may have a first waveguide surface and a second waveguide surface parallel to the first waveguide surface. A first volume holographic light coupling element (e.g., first light coupling device 1015-*a*) may be disposed between the first waveguide surface and the second waveguide surface. The first volume holographic light coupling element may have a first reflective axis (e.g., reflective axes 1020-*a* and 1020-*b*) that is oriented on a plane parallel to the first waveguide surface.

In some cases, a second volume holographic light coupling element (e.g., second light coupling device 1025-*a*) may be disposed between the first waveguide surface and the second waveguide surface. The second volume holographic light coupling element may have a second reflective axis that is oriented on a plane orthogonal to the plane on which the first reflective axis is oriented.

Additional examples and various implementations are contemplated using the pupil equalization techniques described herein.

Figure 10B:
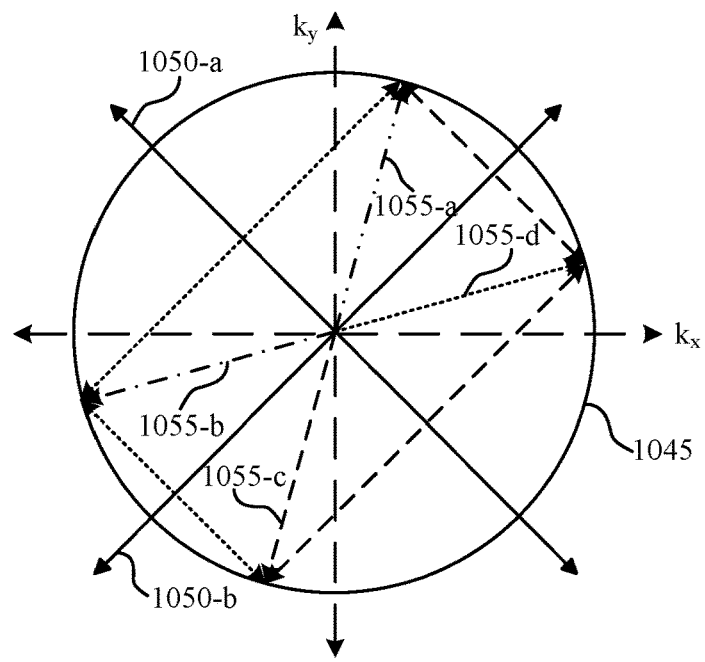
FIG. 10B illustrates a k-space representation of the superposition of grating structures (crossed skew mirror) as described in reference to FIG. 10A.

FIG. 10B illustrates a k-space representation 1045 of the superposition of grating structures (crossed skew mirror) as described in reference to FIG. 10A. An input light ray representing a pair of guided modes may fill the crossed skew mirror comprising orthogonal skew axes 1050-*a* and 1050-*b*. The guided modes may experience mode diffusion, and populate into the eight coupled modes, where one of the light rays may preserve the direction of the original input light ray.

For example, an input ray introduced through the entrance pupil, or a ray propagating in parallel direction 1055-*d* may propagate to the crossed skew mirror. The light ray may be diffracted into reflected rays parallel to directions 1055-*a* and 1055-*c*, each comprising a complementary pair of guided modes in the z direction. At subsequent locations of the crossed skew mirror, the reflected rays may be subsequently diffracted into rays parallel to directions 1055-*b* and 1055-*d*, each comprising a complementary pair of guided modes in the z direction. As a result, the reflected rays may propagate to each direction 1055 of the orientation, filling some or all locations of the crossed skew mirror. The process may perpetuate continuously throughout the light coupling device 1015-*a*, diffusing the light introduced at the entrance pupil 1010-*a* to some or all locations of the device, with reference to FIG. 10A.

In some cases, the skew axes 1050 may be oriented in a non-orthogonal manner, allowing for an alternative number of guided modes according to the orientation axes. Furthermore, in some embodiments a superposition of grating structures may impose a plurality of superimposed skew axes exceeding two. Guided modes at the superimposed skew axes may experience mode diffusion in accordance with the oriented configuration of the crossed skew mirror.

Figure 11A:
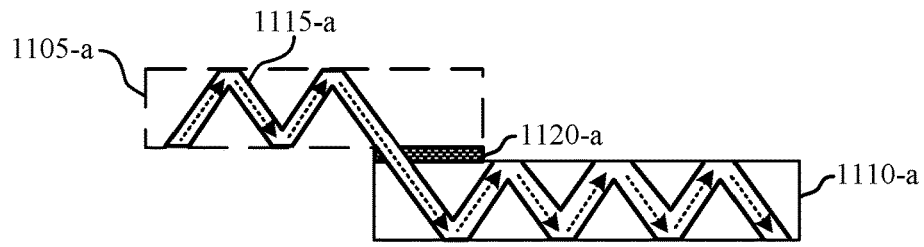
FIG. 11A illustrates an example of an optical system that supports pupil expansion in accordance with various aspects of the present disclosure.

FIG. 11A illustrates an example of an optical system 1100-*a* that supports pupil expansion in accordance with various aspects of the present disclosure. Optical system 1100-*a* may be utilized in an application such as, but not limited to, an HMD device. The optical system 1100-*a* may employ selective coupling to allow a first waveguide 1105-*a* and a second waveguide 1110-*a* to reflect light 1115-*a* towards a specific location. The represented angles are internal angles relative to the surface normal of the first waveguide 1105-*a* and second waveguide 1110-*a*. Refraction at the substrate interface, as well as at the substrate air interface, is ignored for the purpose of illustration.

In some cases, heterogeneous couplers may be used within an image projection system. The heterogeneous couplers may correspond to one or more skew-mirror or non-skew mirror volume holographic couplers, DOEs stamped or etched onto a surface medium, partially reflective surfaces embedded within the waveguide, or the like. Heterogeneous waveguides may also be joined into a single structure (e.g., including a first waveguide 1105-*a* and second waveguide 1110-*a*). For example an intercoupling joint 1120-*a* may be used to integrate the first waveguide 1105-*a* and second waveguide 1110-*a* into a single structure. The joining of the first waveguide 1105-*a* and the second waveguide 1110-*a* may be bonded by an optically transmissive joint 1120-*a* (e.g., a Norland optical adhesive), forming an overlapping joint architecture. One or more light rays 1115-*a* may be reflected within waveguide 1105-*a* and propagate toward the transmissive joint 1120-*a*. At the point of overlap between waveguide 1105-*a* and 1110-*a* (e.g., where the transmissive joint 1120-*a* is present), the light rays 1115-*a* may reflect within both waveguide mediums per the transmissive joint 1120-*a*. The light ray 1115-*a* may then propagate beyond transmissive joint 1120-*a* and reflect solely within second waveguide 1110-*a*.

Inventive aspects of the present disclosure are illustrated by the non-limiting examples of FIG. 11A. For example, a device may have an intercoupled waveguide (e.g., first waveguide 1105-*a*) coupled to the waveguide (second waveguide 1110-*a*). In some cases, the intercoupled waveguide may be coupled to the waveguide by an overlapping joint (e.g., joint 1120-*a*).

Additional examples and various implementations are contemplated using the pupil equalization techniques described herein.

Figure 11B:
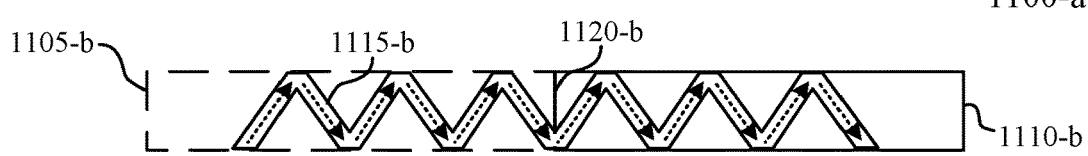
FIG. 11B illustrates an example of an optical system that supports pupil expansion in accordance with various aspects of the present disclosure.

FIG. 11B illustrates an example of an optical system 1100-*b* that supports pupil expansion in accordance with various aspects of the present disclosure. Optical system 1100-*b* may be utilized in an application such as, but not limited to, an HMD device. The optical system 1100-*b* may employ selective coupling to allow a first waveguide 1105-*b* and a second waveguide 1110-*b* to reflect light 1115-*b* towards a specific location. The represented angles are internal angles relative to the surface normal of the first waveguide 1105-*b* and second waveguide 1110-*b*, and the refraction at the substrate interface, as well as at the substrate air interface, is ignored for the purpose of illustration.

In some cases, heterogeneous couplers may be used within an image projection system. The heterogeneous couplers may correspond to one or more skew-mirror or non-skew mirror volume holographic couplers, DOEs stamped or etched onto a surface medium, partially reflective surfaces embedded within the waveguide, or the like. Heterogeneous waveguides may also be joined into a single structure (e.g., including a first waveguide 1105-*b* and second waveguide 1110-*b*). For example an intercoupling joint 1120-*b* may be used to integrate the first waveguide 1105-*b* and second waveguide 1110-*b* into a single structure. The joining of the first waveguide 1105-*b* and the second waveguide 1110-*b* may include, but is not limited to, a joint architecture where the first waveguide 1105-*b* and the second waveguide 1110-*b* are coupled to share a common edge (e.g., butt coupled) at an edge coupling joint 1120-*b*. The edge coupling joint 1120-*b* may be optically transparent. In some cases, the heterogeneous couplers and joining materials may have the same refractive index.

For example, first waveguide 1105-*b* and second waveguide 1110-*b* may be heterogeneous, and intercoupled using a butt-coupling architecture. First waveguides 1105-*b* and second waveguide 1110-*b* may be bonded with an optically transmissive joint. The joint may include an optical adhesive. One or more light rays 1115-*b* may be reflected within first waveguide 1105-*b* and propagate toward the coupled edge of the second waveguide 1110-*b*. The optically transmissive properties of edge coupling joint 1120-*b* may allow the light to propagate through the first waveguide 1105-*b* to the second waveguide 1110-*b*. The light 115-*b* may then reflect within second waveguide 1110-*b*.

Inventive aspects of the present disclosure are illustrated by the non-limiting examples of FIG. 11B. For example, a device may have an intercoupled waveguide (e.g., first waveguide 1105-b) coupled to the waveguide (second waveguide 1110-b). In some cases, the intercoupled waveguide operatively may be coupled to the waveguide by an end to end joint (e.g., joint 1120-b). In other examples, the intercoupled waveguide may be coupled to the waveguide with an optical adhesive element.

Additional examples and various implementations are contemplated using the pupil equalization techniques described herein.

Figure 11C:
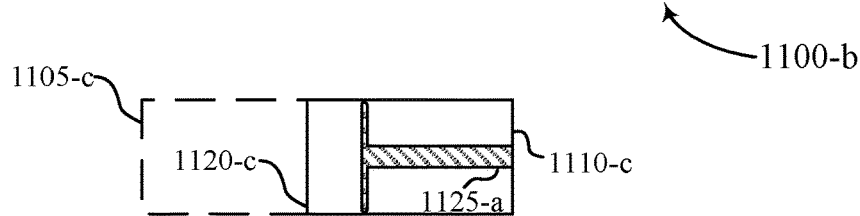
FIG. 11C illustrates an example of an optical system that supports pupil expansion in accordance with various aspects of the present disclosure.

FIG. 11C illustrates an example of an optical system 1100-c that supports pupil expansion in accordance with various aspects of the present disclosure. Optical system 1100-c may be utilized in an application such as, but not limited to, an HMD device. The optical system 1100-c may employ selective coupling to allow a first waveguide 1105-c and a second waveguide 1110-c to reflect light towards a specific location. The represented angles are internal angles relative to the surface normal of the first waveguide 1105-c and second waveguide 1110-c, and the refraction at the substrate interface, as well as at the substrate air interface, is ignored for the purpose of illustration. In some cases, one or more of the waveguides may contain a holographic recording layer (e.g., waveguide medium 1125-a).

An edge coupling facet (e.g., surface 1120-c) may be bonded to the edge of the second waveguide 1110-c containing the waveguide medium 1125-a, using an optical adhesive or the waveguide medium 1125-a. For example, surface 1120-c may be bonded to the second waveguide 1110-c to form a joint (e.g., a butt-coupled joint). In some cases, impeding the guidance of light through an exposed edge of the waveguide medium 1125-a, for example by application of an absorptive coating, may sustain image fidelity.

Figure 11D:
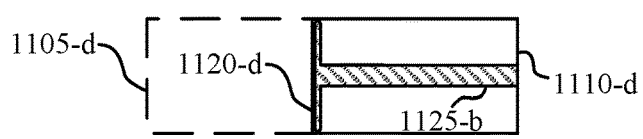
FIG. 11D illustrates an example of an optical system that supports pupil expansion in accordance with various aspects of the present disclosure.

FIG. 11D illustrates an example of an optical system 1100-d that supports pupil expansion in accordance with various aspects of the present disclosure. Optical system 1100-d may be utilized in an application such as, but not limited to, an HMD device. The optical system 1100-d may employ selective coupling to allow a first waveguide 1105-d and a second waveguide 1110-d to reflect light towards a specific location. The represented angles are internal angles relative to the surface normal of the first waveguide 1105-d and second waveguide 1110-d, and the refraction at the substrate interface, as well as at the substrate air interface, is ignored for the purpose of illustration. In some cases, one or more of the waveguides may contain a holographic recording layer (e.g., waveguide medium 1125-b).

In some cases, a butt-coupled joint 1120-d may be coupled to second waveguide 1110-d, containing the waveguide medium 1125-b, without an edge coupling facet. As a result, butt-coupled joint 1120-d may be formed in the same process step as the fabrication of second waveguide 1110-d, including holographic recording layer 1125-b.

Figure 11E:
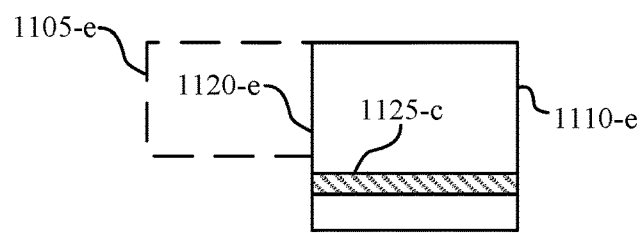
FIG. 11E illustrates an example of an optical system that supports pupil expansion in accordance with various aspects of the present disclosure.

FIG. 11E illustrates an example of an optical system 1100-e that supports pupil expansion in accordance with various aspects of the present disclosure. Optical system 1100-e may be utilized in an application such as, but not limited to, an HMD device. The optical system 1100-e may employ selective coupling to allow a first waveguide 1105-e and a second waveguide 1110-e to reflect light towards a specific location. The represented angles are internal angles relative to the surface normal of the first waveguide 1105-e and second waveguide 1110-e, and the refraction at the substrate interface, as well as at the substrate air interface, is ignored for the purpose of illustration. In some cases, one or more of the waveguides may contain a holographic recording layer (e.g., waveguide medium 1125-c).

In some cases, a butt-coupled joint 1120-e may be bonded to the edge of a substrate of the second waveguide 1110-e, containing the waveguide medium 1125-c, but not the exposed edge of waveguide medium 1125-c. Coupling to a substrate of the second waveguide 1110-e may impede the guidance of light through an exposed edge of waveguide medium 1125-c and sustain image fidelity.

In some examples, the coupling joint architecture as represented by the optical systems 1100 may include an absorptive, reflective, birefringent, or alternative optical element. An absorptive or reflective blocking layer may be used to prevent light from being coupled into the edge of a waveguide medium 1125. A birefringent layer may be included to rotate the polarization of light passing through the coupling joint 1120. The joint 1120 may be overlapping (not shown), and may contain a partially reflective layer in order to control the coupled light. The reflective layer may be spatially varying (e.g., high near edges and low near center) in order to reduce the sharp images of the aperture formed by the coupling joint architecture, thus reducing scattering and improving intensity homogeneity.

Figure 12:
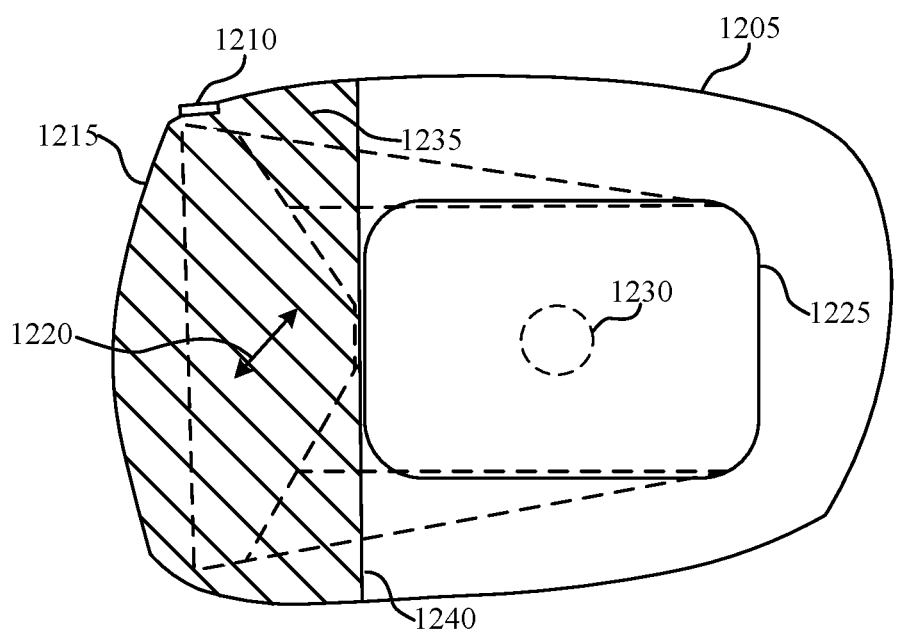
FIG. 12 illustrates an example of an optical lens that supports pupil expansion in accordance with various aspects of the present disclosure.

FIG. 12 illustrates an example of an optical lens 1200 that supports pupil expansion in accordance with various aspects of the present disclosure. The optical lens 1200 may include waveguide 1205, light input section 1210, first light coupling device 1215 (e.g., cross coupler), reflective axis 1220, second light coupling device 1225 (e.g., output coupler), eye box 1230, and one or more partially reflective louvers 1235. Waveguide 1205 may also include another light coupling device (e.g., an input coupler); however, the input coupler is ignored for the purpose of illustration. Waveguide 1205 may include a first and second surface parallel to each other and a light receiving end proximal to the light input section 1210 and a light output end distal to the light input section 1210.

In some cases, the first light coupling device 1215 may contain one or more louvers 1235, DOEs, VHGs, prisms, liquid crystals, or the like. The feature for beam direction from the first light coupling device 1215 to the second light coupling device 1225 may be within one or more loci (not shown) of the first light coupling device 1215, corresponding to varying vertical field angles. Input light may enter the light input section 1210 and propagate to the one or more loci of the first light coupling device 1215. In some cases, the light may be reflected and/or diffracted in an alternate direction, toward the second light coupling device 1225. The reflected light may then be directed at the second light coupling device 1225, and reflected towards the eye box 1230.

In some embodiments, the first light coupling device 1215 may allow one of the projected image dimensions to remain unguided through the path from the light input section 1210 to the eye box 1230. The first light coupling device 1215 with one or more louver mirrors 1235 may reflect input light in any given polarization state whereas a diffraction-based first light coupling device may partially reflect some polarization states.

Inventive aspects of the present disclosure are illustrated by the non-limiting examples of FIG. 12. For example, a device may have a waveguide having a first waveguide surface and a second waveguide surface parallel to the first waveguide surface. A light coupling element (e.g., first light coupling device 1215) may be disposed between the first waveguide surface and the second waveguide surface. The light coupling element may have a first reflective axis (e.g., reflective axis 1220) that may be oriented on a plane parallel to the first waveguide surface. The device may also have a volume holographic light coupling element (e.g., second light coupling device 1225) disposed between the first waveguide surface and the second waveguide surface. The volume holographic light coupling element may have a second reflective axis that is oriented on a plane orthogonal to the plane on which the first reflective axis is oriented.

In some cases, the light coupling element may comprise a partially reflective louver (e.g., louver mirror 1235). The partially reflective louver may be configured to reflect light of a wavelength about the first reflective axis at a first incidence angle. The light coupling element may be coupled to the volume holographic light coupling element by an end to end joint (e.g., joint 1240).

The device may further comprise a first grating structure within a grating medium of the volume holographic light coupling element. The first grating structure may be configured to reflect light of a wavelength about the first reflective axis at a first incidence angle. The first reflective axis may be offset from a surface normal of the grating medium. In some cases, the surface normal of the grating medium may correspond to a surface normal of the waveguide. The device may also comprise a second grating structure within the grating medium of the volume holographic light coupling element at least partially non-overlapping with the first grating structure. The second grating structure may be configured to reflect light of the wavelength about the second reflective axis at a second incidence angle different from the first incidence angle. The second reflective axis offset from the surface normal of the grating medium. In some cases, the surface normal of the grating medium may correspond to a surface normal of the waveguide.

In some cases, the first grating structure may be further configured to reflect light of the wavelength about the first reflective axis offset from the surface normal of the grating medium at a first range of incidence angles including the first incidence angle, where each incidence angle of the first range of incidence angles is greater than the second incidence angle. The first grating structure may comprise at least three holograms, each of the at least three holograms may correspond to a unique incidence angle within the first range of incidence angles, and where an adjacent $|\Delta K_G|$ for the at least three holograms has a mean value that resides between $1.0\times10^4$ and $1.0\times10^6$ radians per meter (rad/m).

In some examples, the wavelength may comprise one of a visible red light wavelength, a visible blue light wavelength, or a visible green light wavelength. The first grating structure may be further configured to reflect light of a plurality of wavelengths at the first incidence angle and the second grating structure may be further configured to reflect light of the plurality of wavelengths at the second incidence angle. In some cases, the plurality of wavelengths includes at least two of a visible red light wavelength, a visible blue light wavelength, or a visible green light wavelength.

Additional examples and various implementations are contemplated using the pupil equalization techniques described herein.

Figure 13A:
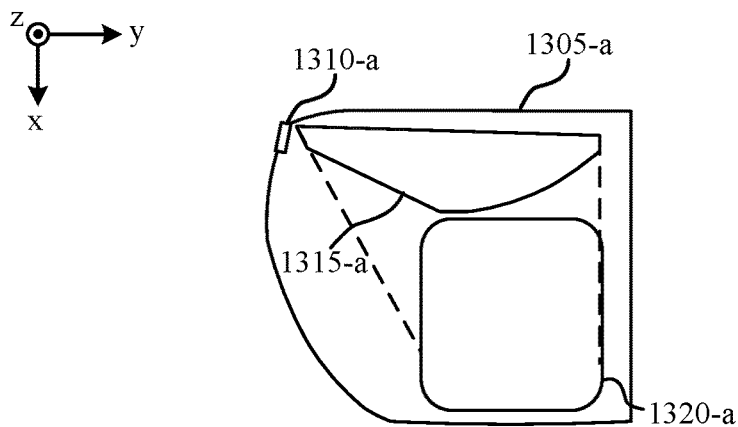
FIG. 13A illustrates an example of an optical lens that supports pupil expansion in accordance with various aspects of the present disclosure.

FIG. 13A illustrates an example of an optical lens 1300-a that supports pupil expansion in accordance with various aspects of the present disclosure. The optical lens 1300-a may include waveguide 1305-a, light input section 1310-a, first light coupling device 1315-a (e.g., cross coupler), and second light coupling device 1325-a (e.g., output coupler). Waveguide 1305-a may also include another light coupling device (e.g., an input coupler); however, the input coupler is ignored for the purpose of illustration. Waveguide 1305-a may include a first and second surface parallel to each other and a light receiving end proximal to the light input section 1310-a and a light output end distal to the light input section 1310-a.

Figure 13B:
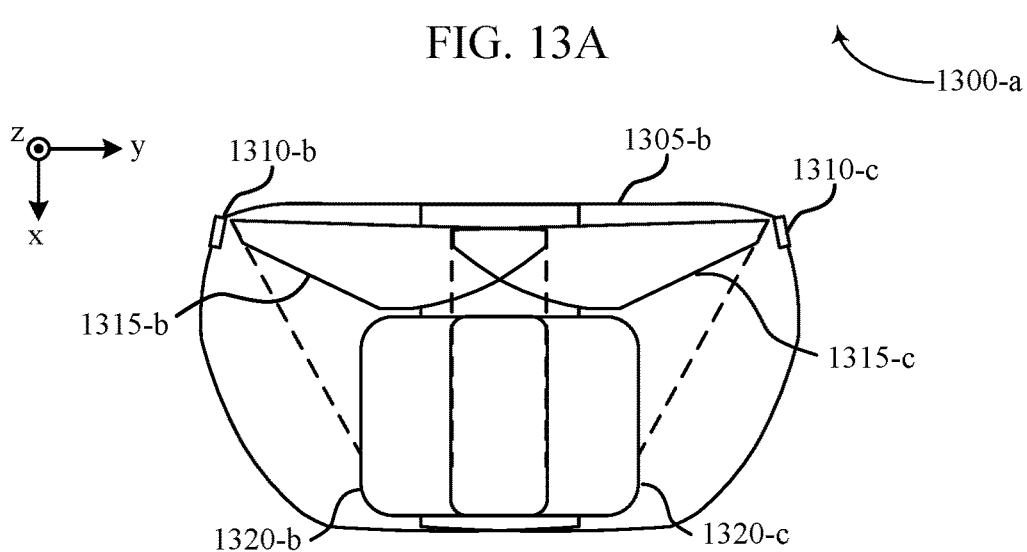
FIG. 13B illustrates an example of an optical lens that supports pupil expansion in accordance with various aspects of the present disclosure.

FIG. 13B illustrates an example of an optical lens 1300-b that supports pupil expansion in accordance with various aspects of the present disclosure. The optical lens 1300-b may include waveguide 1305-b, light input sections 1310-b and 1310-c, first light coupling devices 1315-b and 1315-c (e.g., cross coupler), and second light coupling devices 1325-b and 1325-c (e.g., output coupler). Waveguide 1305-b may also include another light coupling device (e.g., an input coupler); however, the input coupler is ignored for the purpose of illustration. Waveguide 1305-b may include a first and second surface parallel to each other and a light receiving end proximal to the light input sections 1310-b and 1310-c and a light output end distal to the light input sections 1310-b and 1310-c.

Some architectures of optical lens 1300-b may implement a plurality of waveguides, input couplers, first light coupling devices, and/or second light coupling devices. The use of multiple light coupling devices may expand the FOV of the image projection system. For example, a light coupling device which displays the left side of a horizontal field may be combined with a light coupling device which displays the right side of a horizontal field. As such, an expanded, combined horizontal FOV may be result from this arrangement of light coupling devices. For example, the two halves of the combined FOV image may employ image processing techniques and may be blended. The combined FOV may exceed the range attainable with a single light coupling device. For example, the combined FOV may be include a combined horizontal FOV of 83.9 degrees, a combined vertical FOV of 53.4 degrees, and a combined diagonal FOV of 91.7 degrees.

In some embodiments, the light input sections 1310-b and 1310-c may be placed at multiple reference orientations. For example, light input section 1310-b may be located on an outside edge of first light coupling device 1315-b and light input section 1310-c may be located on an outside edge of the first light coupling device 1315-c. One or more projectors may be implemented for image projection to the input pupil. One or more waveguides 1305-b may be include the multiplicity of configured light coupling devices. If in a common waveguide, a two-first light coupling device, single second light coupling device configuration may be used. In some cases, waveguide 1305-b may include second light coupling device 1320-b and second light coupling device 1320-c.

Inventive aspects of the present disclosure are illustrated by the non-limiting examples of FIG. 13B. For example, a device may have first waveguide section (e.g., first light coupling devices 1315-b) located within the waveguide, a second waveguide section located (e.g., first light coupling devices 1315-c) within the waveguide, a first entrance pupil (e.g., light input section 1310-b) located at a first edge of the first waveguide section, and a second entrance pupil (e.g., light input section 1310-c) located a second edge of the second waveguide section. In some cases, the first waveguide section and the second waveguide section may at least partially overlap.

Additional examples and various implementations are contemplated using the pupil equalization techniques described herein.

Figure 13C:
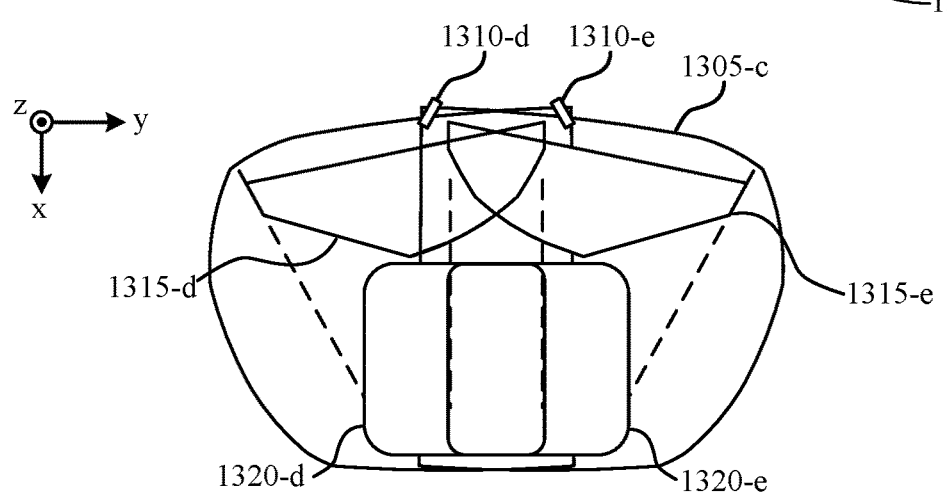
FIG. 13C illustrates an example of an optical lens that supports pupil expansion in accordance with various aspects of the present disclosure.

FIG. 13C illustrates an example of an optical lens 1300-c that supports pupil expansion in accordance with various aspects of the present disclosure. The optical lens 1300-c may include waveguide 1305-c, light input sections 1310-d and 1310-e, first light coupling devices 1315-d and 1315-e (e.g., cross coupler), and second light coupling devices 1325-d and 1325-e (e.g., output coupler). Waveguide 1305-b may also include another light coupling device (e.g., an input coupler); however, the input coupler is ignored for the purpose of illustration. Waveguide 1305-c may include a first and second surface parallel to each other and a light receiving end proximal to the light input sections 1310-d and 1310-e and a light output end distal to the light input sections 1310-d and 1310-e.

In some embodiments, the light input sections 1310-d and 1310-e may be placed at multiple reference orientations. For example, light input section 1310-e may be located on an inside edge of first light coupling device 1315-e and light input section 1310-e may be located on an inside edge of the first light coupling device 1315-e. One or more projectors may be implemented for image projection to the input pupil. One or more waveguides 1305-b may be include the multiplicity of configured light coupling devices. If in a common waveguide, two first light coupling devices, and a single second light coupling device configuration may be used. In some cases, waveguide 1305-c may include second light coupling device 1320-d and second light coupling device 1320-e.

In some cases, first light coupling device 1315-d and 1315-e may be aligned to the FOV centers of the first light coupling device 1315-d and 1315-e. That is, FOV center alignment may provide a more compact multiple light coupling device architecture. In some cases, first light coupling devices 1315-d and 1315-e may be tiled in such a way to align the FOV centers. In some embodiments, multiple tiling patterns may be used.

Figure 14:
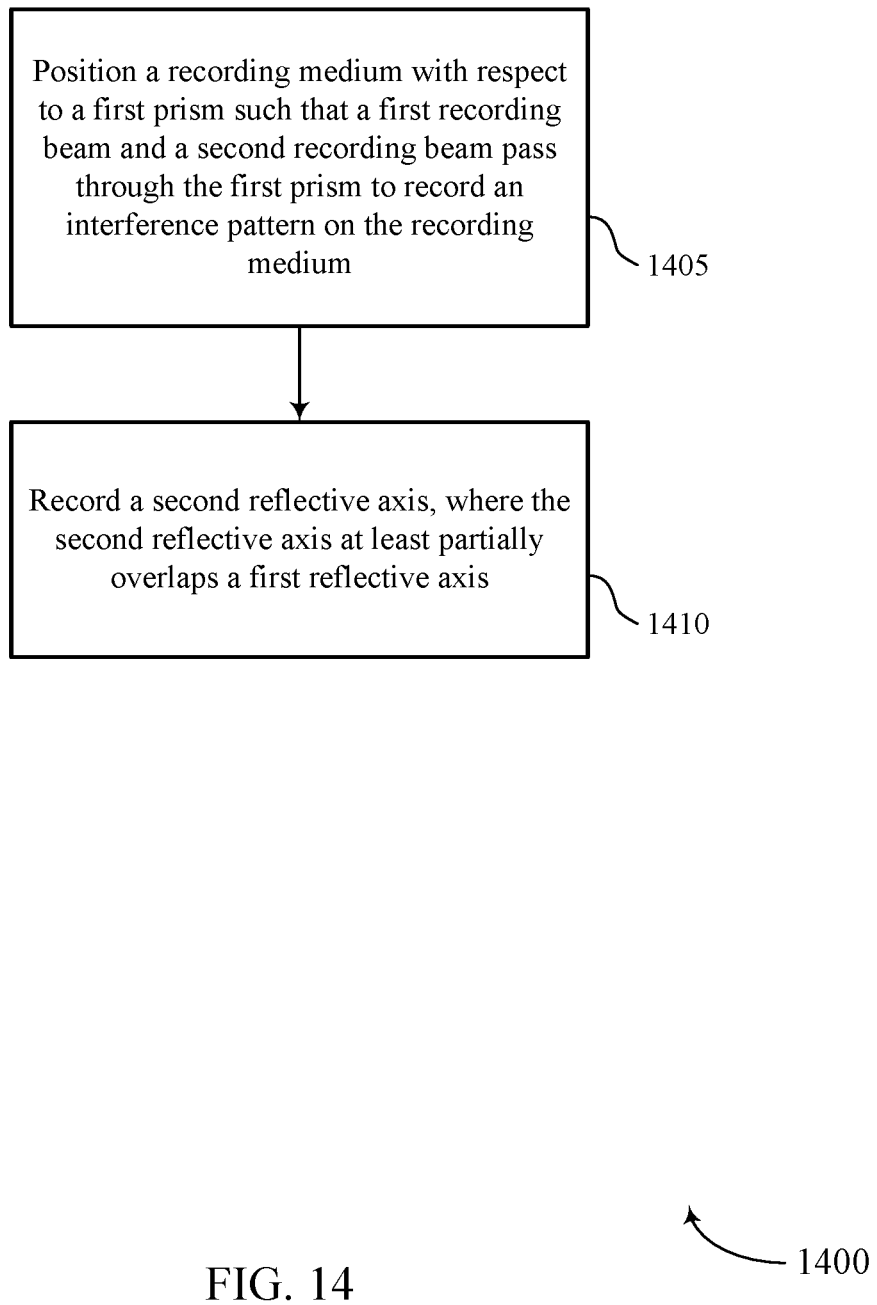
FIG. 14 is a flowchart diagram of an example method for manufacturing an apparatus for equalizing light in accordance with various aspects of the disclosure.

FIG. 14 shows a flowchart illustrating a method 1400 of manufacturing a cross coupler skew mirror in accordance with aspects of the present disclosure. The operations of method 1400 may be implemented by a system for manufacturing a skew mirror or its components as described herein. For example, the operations of method 1400 may be performed with reference to FIGS. 1 through 13.

At block 1405, a recording medium may be positioned with respect to a first prism such that a first recording beam and a second recording beam pass through the first prism to record an interference pattern on the recording medium. The operations of block 1405 may be performed according to the methods described herein. In certain examples, aspects of the operations of block 1405 may be performed by a system for manufacturing a cross coupler skew mirror (e.g., a system as described in FIGS. 5A and 5B).

At block 1410, a first reflective axis may be recorded in the recording medium such that a first reflective axis is oriented on a plane parallel to a thickness dimension of the recording medium. The operations of block 1410 may be performed by a system for manufacturing a cross coupler skew mirror according to the pupil expansion techniques described herein. Additional features as described with reference to FIGS. 1 through 13 may be formed in the recording medium for use as a grating medium in a waveguide and optical device or system.

It should be noted that these methods describe possible implementation, and that the operations and the steps may be rearranged or otherwise modified such that other implementations are possible. In some examples, aspects from two or more of the methods may be combined. For example, aspects of each of the methods may include steps or aspects of the other methods, or other steps or techniques described herein.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein given the benefit of the present disclosure. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein throughout the entirety of the specification, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or"

as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 221.03.

The term "approximately," refers to plus or minus 10% of the value given.

The term "about," refers to plus or minus 20% of the value given.

The term "reflective axis" refers to an axis that bisects an angle of incident light relative to its reflection. The absolute value of an angle of incidence of the incident light relative to the reflective axis is equal to the absolute value of the angle of reflection of the incident light's reflection, relative to the reflective axis. For conventional mirrors, the reflective axis is coincident with surface normal (i.e., the reflective axis is perpendicular to the mirror surface). Conversely, implementations of skew mirrors according to the present disclosure may have a reflective axis that differs from surface normal, or in some cases may have a reflective axis that is coincident with surface normal. Persons skilled in the art given the benefit of the present disclosure will recognize that a reflective axis angle can be determined by adding an angle of incidence to its respective angle of reflection, and dividing the resulting sum by two. Angles of incidence and angles of reflection can be determined empirically, with multiple measurements (generally three or more) used to generate a mean value.

The term "reflection" and similar terms are used in this disclosure in some cases where "diffraction" might ordinarily be considered an appropriate term. This use of "reflection" is consistent with mirror-like properties exhibited by skew mirrors and helps avoid potentially confusing terminology. For example, where a grating structure is said to be configured to "reflect" incident light, a conventional artisan might prefer to say the grating structure is configured to "diffract" incident light, since grating structures are generally thought to act on light by diffraction. However, such use of the term "diffract" would result in expressions such as "incident light is diffracted about substantially constant reflective axes," which could be confusing. Accordingly, where incident light is said to be "reflected" by a grating structure, persons of ordinary skill in art, given the benefit of this disclosure, will recognize that the grating structure is in fact "reflecting" the light by a diffractive mechanism. Such use of "reflect" is not without precedent in optics, as conventional mirrors are generally said to "reflect" light despite the predominant role diffraction plays in such reflection. Artisans of ordinary skill thus recognize that most "reflection" includes characteristics of diffraction, and "reflection" by a skew mirror or components thereof also includes diffraction.

The term "light" refers to electromagnetic radiation familiar to persons skilled in the art. Unless reference is made to a specific wavelength or range of wavelengths, such as "visible light", which refers to a part of the electromagnetic spectrum visible to the human eye, the electromagnetic radiation can have any wavelength.

The terms "hologram" and "holographic grating" refer to a recording of an interference pattern generated by interference between multiple intersecting light beams. In some examples, a hologram or holographic grating may be generated by interference between multiple intersecting light beams where each of the multiple intersecting light beams remains invariant for an exposure time. In other examples, a hologram or holographic grating may be generated by interference between multiple intersecting light beams where an angle of incidence of at least one of the multiple intersecting light beams upon the grating medium is varied while the hologram is being recorded, and/or where wavelengths are varied while the hologram is being recorded (e.g., a complex hologram or complex holographic grating).

The term "sinusoidal volume grating" refers to an optical component which has an optical property, such as refractive index, modulated with a substantially sinusoidal profile throughout a volumetric region. Each (simple/sinusoidal) grating corresponds to a single complementary vector pair in k-space (or a substantially point-like complementary pair distribution in k-space).

The term "entrance pupil" refers to a real or virtual aperture passing a beam of light, at its minimum size, entering into imaging optics.

The term "eye box" refers to a two-dimensional area outlining a region wherein a human pupil may be placed for viewing the full field of view at a fixed distance from a grating structure.

The term "eye relief" refers to a fixed distance between a grating structure and a corresponding eye box.

The term "exit pupil" refers to a real or virtual aperture passing a beam of light, at its minimum size, emerging from imaging optics. In use, the imaging optics system is typically configured to direct the beam of light toward image capture means. Examples of image capture means include, but are not limited to, a user's eye, a camera, or other photodetector.

The term "grating medium" refers to a physical medium that is configured with a grating structure for reflecting light. A grating medium may include multiple grating structures.

The term "grating structure" refers to one or more gratings configured to reflect light. In some examples, a grating structure may include a set of gratings that share at least one common attribute or characteristic (e.g., a same wavelength of light to which each of the set of gratings is responsive). In some implementations, a grating structure may include one or more holograms. In other implementations, a grating structure may include one or more sinusoidal volume gratings. In some examples, the grating structures may be uniform with respect to a reflective axis for each of the one or more gratings (e.g., holograms or sinusoidal gratings). Alternatively or additionally, the grating structures may be uniform with respect to a length or volume for each of the one or more gratings (e.g., holograms or sinusoidal volume gratings) within the grating medium The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

In the appended figures, similar components or features may have the same reference label. Further, various components of the same type may be distinguished by following the reference label by a dash and a second label that distinguishes among the similar components. If just the first reference label is used in the specification, the description may be applicable to any one of the similar components having the same first reference label irrespective of the second reference label.

What is claimed is:

1. A device comprising:
   a waveguide having a first waveguide surface and a second waveguide surface parallel to the first waveguide surface; and
   a volume holographic light coupling element disposed between the waveguide surface and the second waveguide surface, the volume holographic light coupling element being configured to reflect incident light as reflected light, the incident light having a first non-zero angle of incidence with respect to a first axis on a surface normal of the waveguide and a second angle of incidence with respect to a second axis different from the first axis, the first non-zero angle of incidence being within a total internal reflection (TIR) range of the waveguide, the reflected light having a first angle of reflection within the TIR range with respect to the first axis and a second angle of reflection with respect to the second axis, the second angle of reflection being different from the second angle of incidence, the volume holographic light coupling element comprising:
      a first coupling portion that is configured to reflect at least a portion of the incident light as reflected light about a first reflective axis and a second coupling portion that is configured to reflect at least a portion of the incident light as reflected light about a second reflective axis oriented on a plane parallel to the first waveguide surface, the second reflective axis being non-parallel with respect to the first reflective axis.

2. The device of claim 1, wherein the first reflective axis is oriented parallel to the first waveguide surface.

3. The device of claim 2, further comprising:
   an additional volume holographic light coupling element disposed between the first waveguide surface and the second waveguide surface, the additional volume holographic light coupling element having a third reflective axis different from the first and second reflective axes.

4. The device of claim 3, wherein the third reflective axis is oriented orthogonal to the first reflective axis.

5. The device of claim 1, wherein the volume holographic light coupling element comprises:
   a grating medium; and
   a first grating structure within the grating medium, the first grating structure being configured to reflect at least a portion of the incident light about the first reflective axis at the first non-zero angle of incidence within the TIR range with respect to the first axis.

6. The device of claim 5, wherein the volume holographic light coupling element further comprises:
   a second grating structure within the grating medium, the second grating structure being configured to reflect at least a portion of the incident light about the second reflective axis.

7. The device of claim 6, wherein the first and second reflective axes differ by 0.25 degrees or less.

8. The device of claim 6, wherein the first and second coupling portions at least partially overlap.

9. The device of claim 6, wherein the first grating structure corresponds to a first locus of one or more volume holograms associated with a first internal field of view (FOV) angle of image light and the second grating structure corresponds to a second locus of one or more volume holograms associated with a second internal FOV angle of the image light different from the first internal FOV angle.

10. The device of claim 9, wherein the first locus and the second locus at least partially overlap.

11. The device of claim 5, wherein the first grating structure is further configured to reflect at least a portion of the incident light about the first reflective axis at a first range of incidence angles including the first incidence angle, each incidence angle of the first range of incidence angles being within the TIR range with respect to the first axis.

12. The device of claim 1, wherein the volume holographic light coupling element comprises a grating medium that is at least 70 μm thick and the grating medium comprises a plurality of volume holograms configured to Bragg-match the incident light for at least some angles of incidence within the TIR range.

13. The device of claim 1, wherein the first reflective axis is configured to reflect at least a portion of the incident light as reflected light within a first location of the waveguide and the second reflective axis is configured to reflect at least a portion of the incident light as reflected light within a second location of the waveguide.

14. The device of claim 1, wherein the first coupling portion at least partially overlaps the second coupling portion such that the first reflective axis is configured to reflect at least a portion of the incident light at an overlapping location and the second reflective axis is configured to reflect at least a portion of the incident light at the overlapping location.

15. The device of claim 1, wherein the first coupling portion of the volume holographic light coupling element and the second coupling portion of the volume holographic light coupling element are aligned at a joint.

16. The device of claim 15, further comprising:
an entrance pupil element aligned with the joint associated with the first coupling portion and the second coupling portion such that the entrance pupil element is configured to allow input light into the first coupling portion and the second coupling portion.

17. The device of claim 1, wherein the volume holographic light coupling element comprises a grating medium that is at least 70 μm thick.

18. The device of claim 17, further comprising an intercoupled waveguide coupled to the waveguide, wherein the intercoupled waveguide is coupled to the waveguide by an overlapping joint.

19. The device of claim 18, wherein the intercoupled waveguide is coupled to the waveguide with an optical adhesive element.

20. The device of claim 18, wherein the intercoupled waveguide operatively is coupled to the waveguide by an end to end joint.

21. The device of claim 1, further comprising:
a first waveguide section located within the waveguide, wherein the volume holographic light coupling element is at least partially disposed within the first waveguide section; and
a first entrance pupil located at a first edge of the first waveguide section.

22. The device of claim 21, further comprising:
a second waveguide section located within the waveguide, wherein the volume holographic light coupling element is at least partially disposed within the second waveguide section; and
a second entrance pupil located at a second edge of the second waveguide section.

23. The device of claim 22, wherein the first waveguide section and the second waveguide section at least partially overlap.

24. A device comprising:
a waveguide having a first waveguide surface and a second waveguide surface parallel to the first waveguide surface; and
a volume holographic light coupling element disposed between the first waveguide surface and the second waveguide surface, the volume holographic light coupling element being configured to reflect incident light as reflected light, the incident light having a first non-zero angle of incidence with respect to a first axis on a surface normal of the waveguide and a second angle of incidence with respect to a second axis different from the first axis, the first non-zero angle of incidence being within a total internal reflection (TIR) range of the waveguide, the reflected light having a first angle of reflection within the TIR range with respect to the first axis and a second angle of reflection with respect to the second axis, the second angle of reflection being different from the second angle of incidence, wherein the volume holographic light coupling element comprises:
a grating medium; and
a grating structure within the grating medium, wherein the grating structure is configured to reflect at least a portion of the incident light about a reflective axis at a range of incidence angles, each incidence angle of the range of incidence angles is within the TIR range with respect to the first axis, the first grating structure comprises at least three volume holograms, and each volume hologram of the at least three volume holograms corresponds to a different respective incidence angle within the range of incidence angles.

25. A device comprising:
a waveguide having a first waveguide surface and a second waveguide surface parallel to the first waveguide surface;
a cross-coupling element disposed between the first waveguide surface and the second waveguide surface, the cross-coupling element having a first reflective axis that is oriented on a plane parallel to the first waveguide surface, wherein the first reflective axis is offset from a surface normal of the first waveguide surface; and
a volume holographic light coupling element disposed between the first waveguide surface and the second waveguide surface, the volume holographic light coupling element having a second reflective axis that is oriented on a plane different from the plane on which the first reflective axis is oriented.

26. The device of claim 25, wherein the cross-coupling element is configured to reflect at least a portion of incident light as reflected light, the incident light having a first angle of incidence within a total internal reflection (TIR) range with respect to a first axis corresponding to a surface normal of the waveguide and a second angle of incidence with respect to a second axis different from the first axis, and the reflected light having a first angle of reflection within the TIR range and a second angle of reflection with respect to the second axis, the second angle of reflection being different from the second angle of incidence.

27. The device of claim 26, wherein the cross-coupling element comprises a partially reflective louver, the partially reflective louver being configured to reflect at least a portion of incident light as reflected light.

28. The device of claim 25, wherein the second reflective axis of the volume holographic light coupling element is oriented orthogonal to the first reflective axis.

29. The device of claim 25, wherein the cross-coupling element is coupled to the volume holographic light coupling element by an end to end joint.

30. The device of claim 25, wherein the volume holographic light coupling element comprises:
a grating medium; and
a first grating structure within the grating medium of the volume holographic light coupling element, the first grating structure being configured to reflect total internal reflection (TIR) light of a wavelength at a first TIR incidence angle about the second reflective axis.

31. The device of claim 30, wherein the volume holographic light coupling element further comprises:
a second grating structure within the grating medium of the volume holographic light coupling element at least partially non-overlapping with the first grating structure, the second grating structure being configured to reflect TIR light of the wavelength at a second TIR incidence angle about the second reflective axis.

32. The device of claim 30, wherein the second TIR incidence angle being different from the first TIR incidence angle by at least 5°.

33. The device of claim 25, wherein the cross-coupling element comprises a partially reflective louver, the partially reflective louver being configured to reflect at least a portion of incident light as reflected light.

34. The device of claim 25, wherein the first grating structure comprises at least three volume holograms, each of the at least three volume holograms corresponding to a unique incidence angle within a range of TIR incidence angles.

35. A head mounted display device, comprising:
a light source for providing image-bearing light; and
an optical lens comprising,
- a light input section of the optical lens for receiving the image-bearing light;
- a waveguide having a first waveguide surface and a second waveguide surface parallel to the first waveguide surface;
- a cross-coupling element disposed between the first waveguide surface and the second waveguide surface, the cross-coupling element having a first reflective axis that is oriented on a plane parallel to the first waveguide surface, wherein the first reflective axis is offset from a surface normal of the first waveguide surface; and
- a volume holographic light coupling element disposed between the first waveguide surface and the second waveguide surface, the volume holographic light coupling element having a second reflective axis that is oriented on a plane different from the plane on which the first reflective axis is oriented.

* * * * *